United States Patent
Gehringer et al.

(10) Patent No.: US 9,528,856 B2
(45) Date of Patent: Dec. 27, 2016

(54) ENERGY-SELF-SUFFICIENT MULTITURN ROTARY ENCODER AND METHOD FOR DETERMINING A UNIQUE POSITION OF AN ENCODER SHAFT BY MEANS OF THE MULTITURN ROTARY ENCODER

(71) Applicant: Fritz Kubler GmbH Zahl- und Sensortechnik, Villingen-Schwenningen (DE)

(72) Inventors: Stephan Gehringer, Dunningen (DE); Jurgen Palczynski, Villingen-Schwenningen (DE); Viktor Steiner, Tuttlingen (DE)

(73) Assignee: Fritz Kübler GmbH Zähl- und Sensortechnik, Villingen-Schwenningen (DE)

( * ) Notice: Subject to any disclaimer, the term of this patent is extended or adjusted under 35 U.S.C. 154(b) by 81 days.

(21) Appl. No.: 14/528,272

(22) Filed: Oct. 30, 2014

(65) Prior Publication Data

US 2015/0130450 A1    May 14, 2015

(30) Foreign Application Priority Data

Apr. 30, 2012 (DE) .......... 10 2012 008 888
Apr. 30, 2012 (DE) .......... 10 2012 017 071
Apr. 30, 2013 (WO) .......... PCT/EP2013/059043

(51) Int. Cl.
G01D 5/16     (2006.01)
G01D 5/14     (2006.01)
G01D 5/347    (2006.01)

(52) U.S. Cl.
CPC .............. G01D 5/16 (2013.01); G01D 5/145 (2013.01); G01D 5/3473 (2013.01)

(58) Field of Classification Search
CPC ....... G01R 33/072; G01R 23/00; G01R 33/09; G01R 33/091; G01B 7/30; F01M 1/16; G07F 17/3209; G07F 17/3213; G07F 17/3223; G07F 17/3288; G07F 17/34; A61M 2005/16863; A61M 5/14228; A61M 5/16831; B62D 15/0215; A61B 17/068; A61B 17/07207; A61B 2017/00398; A61B 17/072; A61B 2017/00734; A61B 17/1155; A61B 18/1445; A61B 2017/2927; A61B 2017/2929; G01D 5/145; G01D 5/2451; G01D 5/12; G01D 5/244; G01D 5/24452; G01D 5/14; G01D 5/147; G01D 5/2013; G01D 5/246; G01D 5/2497; G01D 5/3473; G01D 5/2046
See application file for complete search history.

(56) References Cited

U.S. PATENT DOCUMENTS 5,332,895 A    7/1994    Rieder et al.
8,283,914 B2   10/2012   Mehnert et al.
(Continued)

FOREIGN PATENT DOCUMENTS

DE    34 08 478 C1    1/1985
DE    44 07 474 C1    5/1995
(Continued)

OTHER PUBLICATIONS

Examination Report for corresponding German patent application No. PCT/EP2013/059043 dated Jul. 10, 2013.
(Continued)

*Primary Examiner* — Arleen M Vazquez
*Assistant Examiner* — Alesa Allgood
(74) *Attorney, Agent, or Firm* — Renner, Otto, Boisselle & Sklar, LLP

(57) ABSTRACT

The present invention relates einen energy-self-sufficient multiturn rotary encoder for detecting a number of complete 360° revolutions of an encoder shaft, rotating about a rotational axis and to which an excitation magnet is mounted in a rotationally fixed manner for generating an external magnetic field, as well as for determining an absolute rotational angle indicating a fine-resolved position within one 360° revolution of the encoder shaft, wherein the multiturn rotary encoder for energy-self sufficiently detecting the number of the complete 360° revolutions of the encoder shaft several functional blocks comprises. Further, a corresponding method is taught.

36 Claims, 15 Drawing Sheets

(56) References Cited

U.S. PATENT DOCUMENTS

| | | | | |
|---|---|---|---|---|
| 8,655,615 | B2* | 2/2014 | Mehnert | G01D 5/145 |
| | | | | 702/78 |
| 8,847,584 | B2* | 9/2014 | Steinich | G01B 7/30 |
| | | | | 324/207.2 |
| 9,200,925 | B2* | 12/2015 | Mehnert | G01D 5/145 |
| 2010/0213927 | A1 | 8/2010 | Mehnert et al. | |
| 2011/0080162 | A1* | 4/2011 | Steinich | G01B 7/30 |
| | | | | 324/207.25 |
| 2011/0184691 | A1* | 7/2011 | Mehnert | G01D 5/145 |
| | | | | 702/151 |
| 2013/0200883 | A1* | 8/2013 | Mehnert | G01D 5/145 |
| | | | | 324/207.2 |
| 2014/0067301 | A1* | 3/2014 | Mehnert | G01D 5/145 |
| | | | | 702/78 |

FOREIGN PATENT DOCUMENTS

| | | | |
|---|---|---|---|
| DE | 196 26 654 A1 | 1/1998 | |
| DE | 102 59 223 B3 | 2/2004 | |
| DE | 10 2004 062 448 A1 | 1/2006 | |
| DE | 10 2007 039051 A | 2/2009 | |
| DE | 10 2009 034 744 A1 | 9/2010 | |
| DE | WO2013164361 A1 * | 11/2013 | G01D 5/14 |
| EP | 0 231 474 B1 | 9/1990 | |
| EP | 0 557 265 A1 | 8/1993 | |
| EP | 0 516 572 B1 | 10/1996 | |
| EP | 2 221 587 A2 | 8/2010 | |

OTHER PUBLICATIONS

International Search Report for corresponding patent application No. PCT/EP2013/059043 dated Jul. 10, 2013.

* cited by examiner

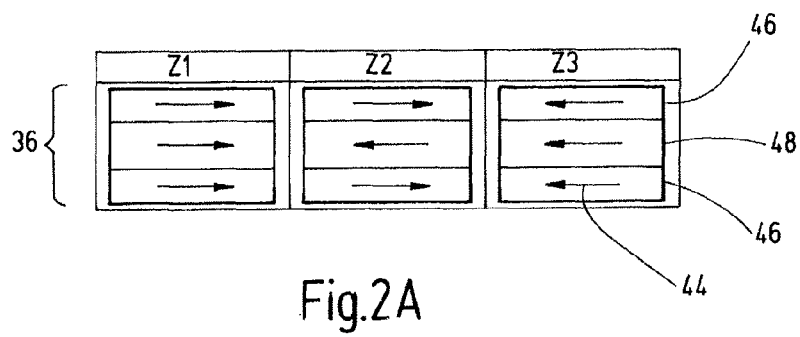

Fig.2A

Simplified exemplary illustration of pulse variations possible:
(during rotation or reversal of the external magnet or the magnetic field)

|  | Sequence of flop-overs of core or jacket |  | Pulse type |
| --- | --- | --- | --- |
| Variation 1 | From Z1 to Z2 | Core flaps-over oppositely to the jacket direction | Large energy-rich pulse |
| Variation 2 | From Z2 to Z1 | Core flaps-over towards jacket direction * | Average pulse having significantly less energy |
| Variation 3 | From Z2 to Z3 | Core flaps-over towards core direction | Negligible small pulse |

*without having reached Z3 before

Fig.2B

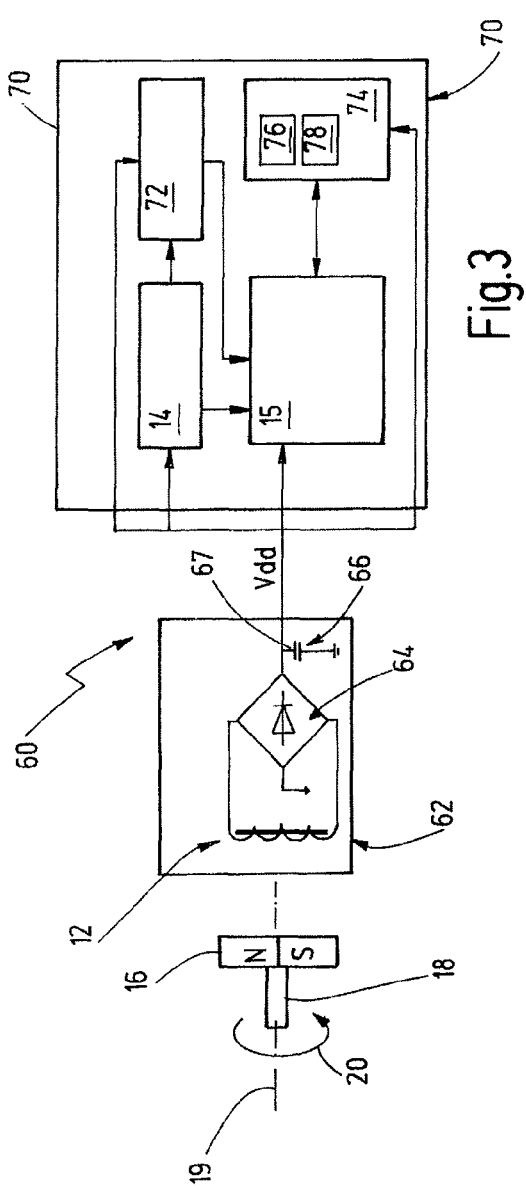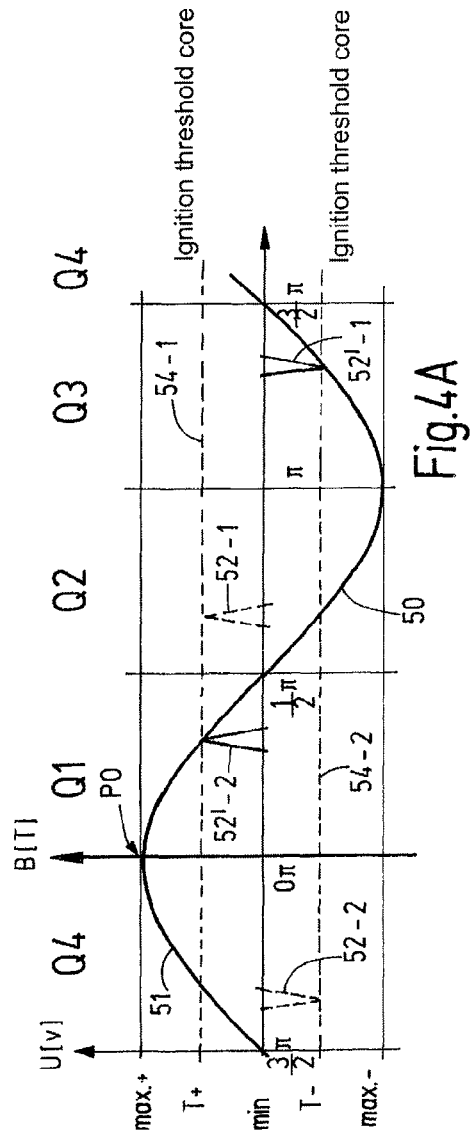

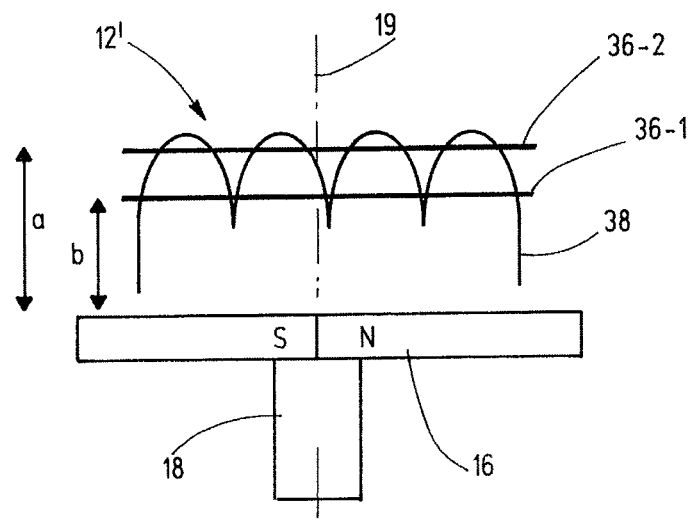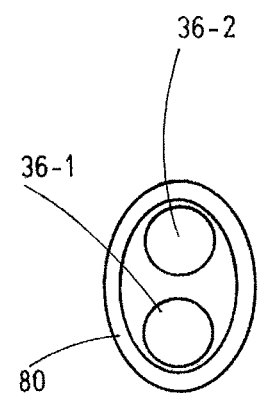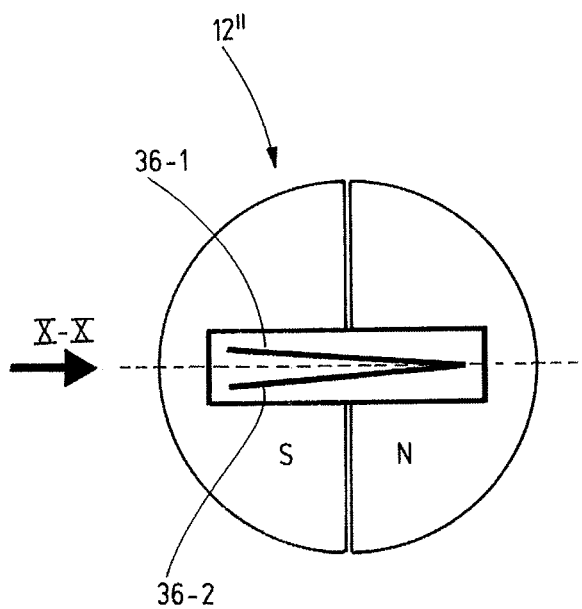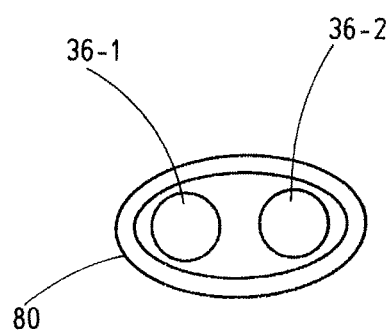
Fig.8A
Fig.8B
Fig.9A
Fig.9B

Rotation without directional change

Rotation including directional change

Start at P0→P1.1→P1.2→P2.1→P3.1 (average pulse (Q1 is not recognized)) ↦P3.2→P4.1

ENERGY-SELF-SUFFICIENT MULTITURN ROTARY ENCODER AND METHOD FOR DETERMINING A UNIQUE POSITION OF AN ENCODER SHAFT BY MEANS OF THE MULTITURN ROTARY ENCODER

RELATED APPLICATIONS

This is a continuation application of the co-pending international application PCT/EP2013/059043 (WO 2013/164361 A1) filed on Apr. 30, 2013, which claims the priorities of the German patent applications DE 10 2012 008 888.4 filed on Apr. 30, 2012, and DE 10 2012 017 071.8 filed on Apr. 30, 2012, all of which are incorporated fully herein by reference.

BACKGROUND OF THE INVENTION

The present invention relates to a multiturn rotary encoder (hereinafter also briefly designated as "MT rotary encoder") for detecting both a fine-resolved position and a fine position (absolute angle within one 360° revolution), and a number of full, or complete, 360° revolutions (revolution counting). Additionally, the invention relates to a method for determining an unambiguous position of an encoder shaft, which rotates about a rotational axis, with an energy-self-sufficient multiturn rotary encoder configured to detect the number of completely passed 360° revolutions of the rotating encoder shaft as well as to detect an absolute rotational angle, which indicates a fine-resolved position within one 360° revolution of the encoder shaft, wherein an excitation magnet is mounted in a rotationally fixed manner to the encoder shaft for generating an external magnetic field which is used at least for determining the fine-resolved position.

RELATED PRIOR ART

Mechanical MT rotary encoders are known (e.g. DE 196 26 654 A1) which are having a number of angle-encoding discs which are connected to each other by means of a speed-reducing gear system. Each respective downstream angle-encoding disc is rotated about one unit corresponding to a resolution thereof, if an upstream angle-encoding disc passes one complete revolution. With this type of rotary encoders a number of the sensing systems multiplies corresponding to the number of encoding discs. High precision is required for the speed-reducing gear system. This type of rotary encoders can only be installed at high costs. The speed-reducing gear system is subjected to wear and allows only limited rotational speeds.

MT rotary encoders having an electronic counting unit are also known (e.g., EP 0 516 572 B1) which have inserted an additional encoding disc, instead of the mechanical gear system, the additional encoding disc being directly connected to the encoder shaft and being used for detecting the number of revolutions of the encoder shaft. A code, which is located on this additional encoding disc, is read out optically and converted into counting pulses which are forwarded to a counting unit. An accumulator, or a battery, is provided together with the counting unit within the rotary encoder for buffering corresponding data. Since the permanent optical reading out of the encoding disc requires reasonably much current, as a light source needs to be supplied constantly with current according to this reading-out method for not losing any data, the accumulators, or the batteries, are relatively big. For this purpose, the rotary encoder is also correspondingly sized, if an accumulator or a battery is to be inserted, which requires a useful data-buffering time of typically several years. Such an optical system is also not appropriate for specific tough cases of use when high mechanical impacts occur or climatic conditions are present which cause condensation.

The document DE 10 2004 062 448 A1 discloses a steering-angle sensor for determining an absolute steering angle of a vehicle.

Further, revolution counters are known which convert kinetic energy of the shaft motion, if an external supply voltage is turned off, into electrical energy thereby electrically supplying at least the revolution counter. Such a method, by which kinetic energies are converted into electrical energy, is based on the so-called Wiegand effect. A corresponding revolution counter is shown, amongst other things, in the document DE 10 259 223 B3. The document DE 10 259 223 B3 discloses an energy-self-sufficient revolution counter on the basis of a Wiegand sensor. With this known solution only one Wiegand sensor and one dipole magnet, as excitation magnet, are used. It is necessary to additionally use a specific low-power Hall sensor, or a second induction coil, for the detection of a polarity of the external magnetic field. In addition, additional flux-conducting pieces are used partially. These measures raise the price of the system of the document DE 10 259 223 B3 considerably. The Hall sensor is a complex circuit arrangement which, after a pulse is triggered in the Wiegand sensor, typically shows a relatively long transient period until the complete operational readiness is reached. However, during this time part of the energy generated by the so-called Wiegand-pulse is lost, for example, in terms of leakage currents. The document DE 10 259 223 B3 does not disclose a detailed overall solution for a revolution counter having a fine-resolving single-turn sensor (hereinafter also briefly designated as "ST sensor").

The document DE 34 08 478 C1 discloses a magneto-inductive incremental encoder which is equipped in an energy-self-sufficient manner with so-called Wiegand wires, or pulse wires. During rotation of these wires at an outer circumference of an (encoder) shaft, to which an excitation magnet is mounted, these wires are passing the magnet so that an abrupt remagnetization of the pulse wires is effected. This remagnetization induces a corresponding voltage in a coil surrounding the pulse wires. By counting the Wiegand pulses, or the remagnetization pulses, an angle position (absolute rotational angle) and the number of the completely passed 360° revolutions can be determined. However, this system does not deliver an absolute position when turned on for the first time.

An absolute MT rotary encoder having an ST function (360° resolving system) is disclosed in the document EP 0 231 474 B1. The MT rotary encoder is coupled to an energy-self-sufficient revolution counter. This means that sensors, which are suitable for detecting full 360° revolutions, do not need to be supplied by energy externally. However, one drawback of this system is that on the one hand a battery for buffering the data is required while an external supply voltage is turned off. On the other hand relatively huge sensoric efforts, in terms of three Wiegand sensors, are a drawback. A circuitry required for synchronizing the ST with the MT is relatively costly with this arrangement.

A solution of the above-described type, which is improved in comparison to the one of EP 0 231 474 B1, is shown in the document DE 44 07 474 C2. The document DE 44 07 474 C2 does not require a battery since the energy, which is delivered by the Wiegand sensors as pulses, is used for both the detecting and counting of full revolutions and for the storing of data in a FRAM memory. However, even in this case the other drawbacks remain, in particular the fact that several Wiegand wires and/or magnets are used.

In general there is the problem with conventional solutions in that clear instructions are lacking on the way how the sensors for detecting the absolute rotational angle can be synchronized with the sensors for detecting the full revolutions at an effort as small as possible. The document DE 10 259 223 B3 teaches that the Hall sensor and the Wiegand sensor additionally need to be arranged in a specific angle to each other, thereby increasing installation work, and a reliable operation of the system over a broad range of temperatures is put at a risk if temperatures of the magnet, the Hall sensors, and/or the Wiegand sensor fluctuate.

SUMMARY OF THE INVENTION

Therefore, it is an object of the present invention to provide a comprehensive solution, which provides a fine-resolving single turn and a multiturn for counting complete 360° revolutions including a suitable method of synchronization which takes care of synchronizing the zero passages of the single turns (ST) and the multiturns (MT), which do not run synchronized to each other.

According to a first aspect of the invention it is disclosed an energy-self-sufficient multiturn rotary encoder for detecting a number of completely passed 360° revolutions of an encoder shaft, which rotates about a rotational axis and to which an excitation magnet is mounted in a rotationally fixed manner for generating an external magnetic field, as well as for determining an absolute rotational angle indicating a fine-resolved position within one 360° revolution of the encoder shaft, wherein the multiturn rotary encoder for energy-self-sufficiently detecting the number of the complete 360° revolutions of the encoder shaft comprises a, preferably one single, pulse sensor for generating energy from a remagnetization pulse, which is caused in the pulse sensor by a sufficiently large change of strength of the external magnetic field, wherein the change of the magnetic-field strength is caused by rotation of the excitation magnet; a, preferably single one, magnetic-field sensor for detecting the strength of the external magnetic field and for generating a corresponding signal the signal value of which corresponds to the strength of the external magnetic field and which can be delivered to the evaluation unit, wherein the signal ideally has a sinusoidal course when the excitation magnet rotates continuously about the rotational axis together with the encoder shaft, and wherein the sinusoidal course is sectionalized for evaluation into a plurality of quadrants which are preferably sized equally; a revolution counter for storing the number of completely passed 360° revolutions of the encoder shaft; a history memory in which a history of quadrant values can be stored; and an evaluation unit which is operated in order to determine the number of completely passed 360° revolutions of the encoder shaft by energy obtained from the remagnetization pulses; wherein the evaluation unit is adapted to: derive one of the quadrants from the delivered signal value, in which the delivered signal value is located, and to deliver a corresponding quadrant value to the history memory while one of the remagnetization pulses occurs.

According to a second aspect of the invention it is disclosed an energy-self-sufficient multiturn rotary encoder configured for energy-self sufficiently detecting a number of completely passed 360° revolutions of an encoder shaft, which rotates about a rotational axis, wherein an excitation magnet is mounted in a rotationally fixed manner to the rotational axis, wherein the excitation magnet generates an external magnetic field, and also being configured for determining an absolute rotational angle indicating a fine-resolved position within one 360° revolution of the encoder shaft, wherein the multiturn rotary encoder comprises: a pulse sensor configured for generating energy from a remagnetization pulse, which is caused in the pulse sensor by a change of strength of the external magnetic field which is sufficiently large, wherein the change of the magnetic-field strength is caused by rotation of the excitation magnet; an evaluation unit; a magnetic-field sensor configured for detecting the strength of the external magnetic field and for generating a corresponding signal a signal value of which corresponds to the strength of the external magnetic field and is delivered to the evaluation unit, wherein, wherein a signal course is sectionalized for evaluation thereof into a plurality of quadrants; a revolution counter configured for storing the number of completely passed 360° revolutions of the encoder shaft; and a history memory adapted for storing a history of quadrant values; wherein the evaluation unit is operated, in order to determine the number of completely passed 360° revolutions of the encoder shaft, with energy obtained from the remagnetization pulse; wherein the evaluation unit is adapted to: derive from the delivered signal value one of the quadrants, in which the delivered signal value is located, and to deliver a corresponding quadrant value to the history memory while one of the remagnetization pulses occurs.

In accordance with a preferred embodiment the pulse sensor is a Wiegand sensor.

With an advantageous embodiment the magnetic-field sensor is high resistive, and is an xMR element, particularly a TMR element, an AMR element, or a GMR element.

Further, it is preferred that the multiturn rotary encoder comprises a rectifier.

In particular, the excitation magnet is a permanent magnet, in particular a dipole, which is preferably mounted centrally to the encoder shaft.

Preferably, the pulse sensor and the magnetic-field sensor are arranged coaxially relative to the encoder shaft and to the excitation magnet such that the pulse sensor and the magnetic-field sensor are oppositely arranged in an axial direction relative to the excitation magnet in a state of the encoder shaft being assembled with the multiturn rotary encoder.

In accordance with another preferred embodiment n remagnetization pulses can be generated for each of the 360° revolutions of the encoder shaft, and each n-th remagnetization pulse of a pulse cycle causes an update of a value of the revolution-counter memory.

With an advantageous embodiment an orientation of the magnetic-field sensor relative to the pulse wire is selected such that the remagnetization pulses respectively are located substantially centrally within the corresponding quadrants.

Further, it is preferred that the multiturn rotary encoder comprises an energy-storage device being connected electrically to the pulse sensor and being charged only by energy obtained from the remagnetization pulses.

Further, according to a third aspect of the invention it is disclosed a method for determining an unambiguous position of an encoder shaft rotating about a rotational axis by means of an energy-self-sufficient multiturn rotary encoder which is configured to detect a number of completely passed 360° revolutions of the rotating encoder shaft as well as to detect an absolute rotational angle indicating a fine-resolved position within one 360° revolution of the encoder shaft to which an excitation magnet is mounted in a rotationally fixed manner for generating an external magnetic field, which is at least utilized for determination of the fine-resolved position, wherein the multiturn rotary encoder comprises a pulse sensor, an energy-storage device, a magnetic-field sensor, a revolution counter, a history memory, and an evaluation unit, wherein the magnetic-field sensor delivers a signal ideally having a sinusoidal shape when the excitation magnet rotates continuously together with the encoder shaft about the rotational axis, and wherein the sinusoidal shape is sectionalized for evaluation into a plurality of quadrants preferably being sized equally, wherein the method comprises the following steps: storing a history of quadrant values in the history memory, wherein each of the quadrant values corresponds to a remagnetization pulse triggered in the pulse sensor by a specific change of the external magnetic field due to rotation of the encoder shaft, and wherein each of the quadrant values is determined by the evaluation unit, which considers a signal value delivered by the magnetic-field sensor due to the remagnetization pulse to the evaluation unit and being delivered to the history memory, wherein n remagnetization pulses are generated for each of the 360° revolutions of the encoder shaft, and wherein each n-th remagnetization pulse causes an update of the revolution counter in terms of a sense-of-rotation-independent incrementing or decrementing of a value of the revolution counter by the evaluation unit; and during a time period, which comprises a discrete point in time, for which the unambiguous position of the encoder shaft is to be determined, carrying out the following steps: supplying the evaluation unit and the magnetic-field sensor with external energy; detecting strength of the external magnetic field at the discrete point in time by means of the magnetic-field sensor and delivering the corresponding signal value to the evaluation unit; determining by means of the evaluation unit in which of the quadrants the delivered signal value is located; inquiring the last quadrant value which has been stored last in the history memory by means of the evaluation unit; checking, by means of the evaluation unit, whether the delivered signal value is located within a forbidden quadrant zone, which is assigned to the quadrant value stored last, wherein a specific forbidden quadrant zone has been determined and recorded in advance for each of the quadrant values; if the delivered signal value is located outside of the forbidden quadrant zone, determining the unambiguous position by summing the absolute rotational angle, which corresponds to the delivered signal value, and the current revolution-counter value; or otherwise, if the delivered signal value is located within the forbidden quadrant zone, evaluating an additional signal, which is generated additionally by the pulse sensor, correcting the revolution-counter value by means of the evaluation unit on the basis of the additional signal, and determining the absolute rotational angle on the basis of the additional signal before the unambiguous position is determined from the absolute rotational angle and the corrected revolution-counter value.

According to a fourth aspect of the invention it is disclosed a method for determining an unambiguous position of an encoder shaft rotating about a rotational axis by means of an energy-self-sufficient multiturn rotary encoder which is configured to detect a number of completely passed 360° revolutions of the rotating encoder shaft, as well as to detect an absolute rotational angle indicating a fine-resolved position within one 360° revolution of the encoder shaft, wherein an excitation magnet is mounted in a rotationally fixed manner to the encoder shaft for generating an external magnetic field, which is at least utilized for determination of the fine-resolved position, wherein the multiturn rotary encoder comprises a pulse sensor, an energy storage device, a magnetic-field sensor, a revolution counter, a history memory, and an evaluation unit, wherein the magnetic-field sensor delivers a signal having a course when the excitation magnet rotates continuously together with the encoder shaft about the rotational axis, and wherein the course shape is sectionalized for evaluation into a plurality of quadrants, wherein the method comprises the following steps: storing a history of quadrant values in the history memory, wherein each of the quadrant values corresponds to a remagnetization pulse triggered in the pulse sensor by a specific change of the external magnetic field due to rotation of the encoder shaft, and wherein each of the quadrant values is determined by the evaluation unit, which considers a signal value, delivered by the magnetic-field sensor due to the remagnetization pulse, to the evaluation unit, and each of the quadrant values is delivered to the history memory, wherein n remagnetization pulses are generated for each 360° revolution of the encoder shaft, and wherein each n-th remagnetization pulse causes an update of the revolution counter in terms of a sense-of-rotation-independent incrementing or decrementing of a value of the revolution counter by the evaluation unit; and during a time period, which comprises a discrete point in time for which the unambiguous position of the encoder shaft is to be determined, carrying out the following steps: supplying the evaluation unit and the magnetic-field sensor with external energy; detecting a strength of the external magnetic field at the discrete point in time by means of the magnetic-field sensor and delivering the corresponding signal value to the evaluation unit; determining by means of the evaluation unit in which of the quadrants the delivered signal value is located; inquiring the last quadrant value, which has been stored last in the history memory, by means of the evaluation unit; checking, by means of the evaluation unit, whether the delivered signal value is located within a forbidden quadrant zone, which is assigned to the quadrant value stored last, wherein a specific forbidden quadrant zone has been determined and recorded in advance for each of the quadrant values; if the delivered signal value is located outside of the forbidden quadrant zone, determining the unambiguous position by summing the absolute rotational angle, which corresponds to the delivered signal value, and the current revolution-counter value; or otherwise, if the delivered signal value is located within the forbidden quadrant zone, evaluating an additional signal, which is generated additionally by the pulse sensor, correcting the revolution-counter value by means of the evaluation unit on the basis of the additional signal and determining the absolute rotational angle on the basis of the additional signal before the unambiguous position is determined from the absolute rotational angle and the corrected revolution-counter value.

Preferably, the specific forbidden quadrant zones are deposited in a memory of the evaluation unit, or in a separate storage element.

Further, the pulse sensor preferably comprises a, preferably one single, pulse wire and a, preferably one single, coil surrounding the pulse wire, wherein the pulse wire comprises an outer jacket and a core arranged within the jacket.

Further, it is preferred that outer boundaries of the forbidden quadrant zones are defined by remagnetization-ignition thresholds of the core.

In accordance with a preferred embodiment the pulse sensor comprises a, preferably one single, pulse wire and a, preferably one single, coil surrounding the pulse wire, and wherein the step of evaluating the additional signal and correcting the revolution-counter values comprises: applying current to the coil for a short period of time so that the external magnetic field of the excitation magnet is superimposed by an additional magnetic field and thereby a test-remagnetization pulse can be generated in the pulse wire which can be measured subsequently by means of the coil, wherein existence or non-existence of the test-remagnetization pulse is delivered as the additional signal from the coil to the evaluation unit; checking by means of the evaluation unit whether or not the additional signal contains the test-remagnetization pulse; and correcting the value of the revolution counter if the additional signal contains the test-remagnetization pulse; or maintaining the current revolution-counter value if the additional signal does not contain the test-remagnetization pulse.

With an advantageous embodiment the step of correcting the value of the revolution counter comprises a sense-of-rotation-independent incrementing or decrementing of the value of the current revolution counter.

Further, it is preferred that the pulse sensor comprises a first pulse wire, at least one second pulse wire, a former within which the pulse wires are arranged, as well as a, preferably one single, coil which in turn surrounds the former, wherein each of the pulse wires comprises an outer jacket and a core, which is arranged within the jacket, and wherein the pulse wires are fixed within the former in respective default positions.

With a preferred embodiment the outer boundaries of the respectively forbidden quadrant zone are defined by remagnetization-ignition thresholds of the cores.

With another preferred embodiment remagnetization pulses of the second pulse wire are utilized as an additional signal.

Further, it is preferred that the pulse wires are spaced to each other in an axial direction of the encoder shaft, and preferably are arranged axially in parallel to each other.

Preferably, the pulse wires are arranged in one single plane which is substantially orientated perpendicular to the rotational axis of the encoder shaft, wherein the first pulse wire encloses an angle which each of the second pulse wires.

With another advantageous embodiment the pulse sensor is arranged coaxially to the excitation magnet, wherein the pulse wires are arranged in at least one plane which respectively is substantially orientated perpendicular to the rotational axis of the encoder shaft and substantially parallel to the rotational plane of the excitation magnet.

Further, it is preferred that the excitation magnet is a dipole magnet arranged in a plane which is orientated substantially perpendicular to the rotational axis.

Preferably, the pulse sensor is arranged eccentrically relative to the rotational axis of the encoder shaft, wherein beside the coaxially arranged excitation magnet at least four additional magnets are provided, which can be mounted to the encoder shaft in a circumferential direction at alternatingly orientated magnetic fields in a regularly distributed manner so that in each of the quadrants at least one remagnetization pulse is generated, wherein such remagnetization pulses, which deviate from the typical remagnetization pulses, deliver the additional signal.

Further, it is preferred to define the number of the additional magnets by $2^n$, wherein n is an integer greater than 2.

According to a fifth aspect of the invention it is disclosed an energy-self-sufficient multiturn rotary encoder for detecting a number of complete 360° revolutions of an encoder shaft, which rotates about a rotational axis and to which an excitation magnet is mounted in a rotationally fixed manner for generating an external magnetic field and to which an optical encoding disc is mounted for determining an absolute rotational angle indicating a fine-resolved position within one 360° revolution of the encoder shaft, wherein the multiturn rotary encoder, which is configured to detect in an energy-self-sufficient manner the number of the complete 360° revolutions of the encoder shaft, comprises: a, preferably one single, pulse sensor for generating energy from a remagnetization pulse which is caused in the pulse sensor by a sufficiently large change in strength of the external magnetic field, wherein the change in the magnetic-field strength is caused by rotation of the excitation magnet; a, preferably one single, optical sensor for detecting a current position of the encoder shaft and for generating a corresponding signal, the signal value of which corresponds to the current position of the encoder shaft, and which signal is deliverable to the evaluation unit, wherein the signal has a course, which is preferably sinusoidal, when the excitation magnet rotates continuously together with the encoder shaft about the rotational axis, and wherein the shape, in terms of evaluation logic, is sectionalized into a plurality of quadrants preferably being sized equally; a revolution counter for storing the number of completely passed 360° revolutions of the encoder shaft; a history memory in which a history of quadrant values can be stored; and an evaluation unit which is operated only with energy obtained from the remagnetization pulses for determining the number of the completely passed 360° revolutions of the encoder shaft; wherein the evaluation unit is adapted to derive one of the quadrants from the delivered signal value, wherein the delivered signal value is located in the one of the quadrants, and to deliver a corresponding quadrant value to the history memory while the remagnetization pulse occurs.

According to a sixth aspect of the invention it is disclosed an energy-self-sufficient multiturn rotary encoder for detecting a number of completely passed 360° revolutions of an encoder shaft, which rotates about a rotational axis and to which an excitation magnet is mounted in a rotationally fixed manner which generates an external magnetic field and to which an optical encoding disc is mounted for determining an absolute rotational angle indicating a fine-resolved position within one 360° revolution of the encoder shaft, wherein the multiturn rotary encoder, which is configured to detect in an energy-self sufficient manner the number of the completely passed 360° revolutions of the encoder shaft, comprises: an evaluation unit; a pulse sensor configured for generating energy from a remagnetization pulse which is caused in the pulse sensor by a sufficiently large change in strength of the external magnetic field, wherein the change in the magnetic-field strength is caused by rotation of the excitation magnet; a optical sensor configured for detecting a current position of the encoder shaft and for generating a corresponding signal, the signal value of which corresponds to a current position of the encoder shaft and is delivered to the evaluation unit, wherein the signal has a course when the excitation magnet rotates continuously together with the encoder shaft about the rotational axis, and wherein the course is sectionalized for evaluation into a plurality of quadrants; a revolution counter for storing the number of completely passed 360° revolutions of the encoder shaft; and a history memory in which a history of quadrant values is stored; wherein the evaluation unit is operated only with energy obtained from the remagnetization pulses for determining the number of the completely passed 360° revolutions of the encoder shaft; wherein the evaluation unit is adapted to derive one of the quadrants from the delivered signal value, wherein the delivered signal value is located in the one of the quadrants, and to deliver a corresponding quadrant value to the history memory while the remagnetization pulse occurs.

Further, it is preferred that the optical sensor comprises an LED diode and a Schmitt trigger.

With a particular embodiment the pulse sensor is a pulse-wire sensor comprising at least one pulse wire and one coil surrounding the at least one wire.

In particular, the rotary encoder further comprises an absolutely coded encoding disc mountable, in a rotationally fixed manner, to the rotary-encoder shaft.

Preferably, the rotary encoder further comprises a register for storing an output signal of the optical sensor.

According to a seventh aspect of the invention it is disclosed a method for determining an unambiguous position of an encoder shaft rotating about a rotational axis by means of an energy-self-sufficient multiturn rotary encoder, which is preferably formed in accordance with the invention and is adapted to optically detect a number of completely passed 360° revolutions of the rotating encoder shaft as well as to optically detect an absolute rotational angle indicating a fine-resolved position within one 360° revolution of the encoder shaft to which an excitation magnet for generating an external magnetic field is mounted in a rotationally fixed manner, wherein the external magnetic field is used for generating an energy required for counting revolutions, wherein the multiturn rotary encoder comprises a pulse sensor, an optical sensor, a revolution counter, a history memory, and an evaluation unit, wherein the optical sensor delivers a signal having a, preferably sinusoidal, course when the encoder shaft rotates continuously about the rotational axis and wherein the course, in terms of an evaluation logic, is sectionalized into a plurality of quadrants preferably being sized equally, wherein the method comprises the following steps: providing an evaluation energy at a point in time t1 if a remagnetization pulse is generated in the pulse sensor; activating the evaluation unit and the optical sensor at a point in time t2 immediately after the evaluation energy is provided; then detecting an optical value, generated by illuminating the encoding disc, and outputting a corresponding signal; determining and outputting a current quadrant corresponding to the output signal, in which quadrant the remagnetization pulse has occurred, by means of the evaluation unit; activating the storage element and updating a quadrant history comprising the quadrant values stored last; and deactivating the evaluation unit after each of the above-mentioned steps is carried out and before the remagnetization pulse decays.

According to an eighth aspect of the invention it is disclosed method for determining an unambiguous position of an encoder shaft, which rotates about a rotational axis, by means of an energy-self-sufficient multiturn rotary encoder, which is adapted to optically detect a number of completely passed 360° revolutions of the rotating encoder shaft as well as to optically detect an absolute rotational angle indicating a fine-resolved position within one 360° revolution of the encoder shaft to which an excitation magnet for generating an external magnetic field is mounted in a rotationally fixed manner, wherein the external magnetic field is used for generating an energy required for counting revolutions, wherein the multiturn rotary encoder comprises a pulse sensor, an optical sensor, a revolution counter, a history memory, and an evaluation unit, wherein the optical sensor delivers a signal having a course when the encoder shaft rotates continuously about the rotational axis, wherein the course is sectionalized for evaluation into a plurality of quadrants, wherein the method comprises the following steps: providing an evaluation energy at a point in time t1 when a remagnetization pulse is generated in the pulse sensor; activating the evaluation unit and the optical sensor at a point in time t2 immediately after the evaluation energy is provided; detecting an optical value, generated by illuminating the encoding disc, and outputting a corresponding signal; determining and outputting a current quadrant corresponding to the output signal, in which quadrant the remagnetization pulse has occurred, by means of the evaluation unit; activating the storage element and updating a quadrant history comprising the quadrant values stored last; and deactivating the evaluation unit after each of the above-mentioned steps is carried out and before the remagnetization pulse decays.

In particular, the method further comprises turning off the optical sensor after the corresponding signal is generated and output.

The method can further comprise: turning on a light source after the evaluation unit and the optical sensor are activated, and turning off the light source when the corresponding signal has been determined.

Preferably, the optical sensor comprises a photodiode and a Schmitt trigger.

BRIEF DESCRIPTION OF THE DRAWINGS

It is clear that the above-mentioned and hereinafter still to be explained features cannot only be used in the respectively given combination but also in other combinations or alone without departing from the scope of the present invention.

Embodiments of the invention are illustrated in the figures and will be explained in more detail in the following description, wherein:

FIG. 2A shows different states of a pulse wire;
FIG. 2B shows a table of pulse variations;
FIG. 3 shows a block diagram of the rotary encoder of FIG. 1;
FIG. 4A shows a course of a magnetic field generated by an excitation magnet connected in a rotationally fixed manner to the encoder shaft;
FIG. 8A shows a side view of a pulse-wire sensor having a number of wires;
FIG. 8B shows a sectional view of the pulse-wire sensor having a number of wires;
FIG. 9A shows a side view of another pulse-wire sensor having several wires;
FIG. 9B shows a sectional view of the another pulse-wire sensor having several wires;
FIG. 10B shows a signal including directional changes.

PREFERRED EMBODIMENTS OF THE INVENTION

Figure 1:
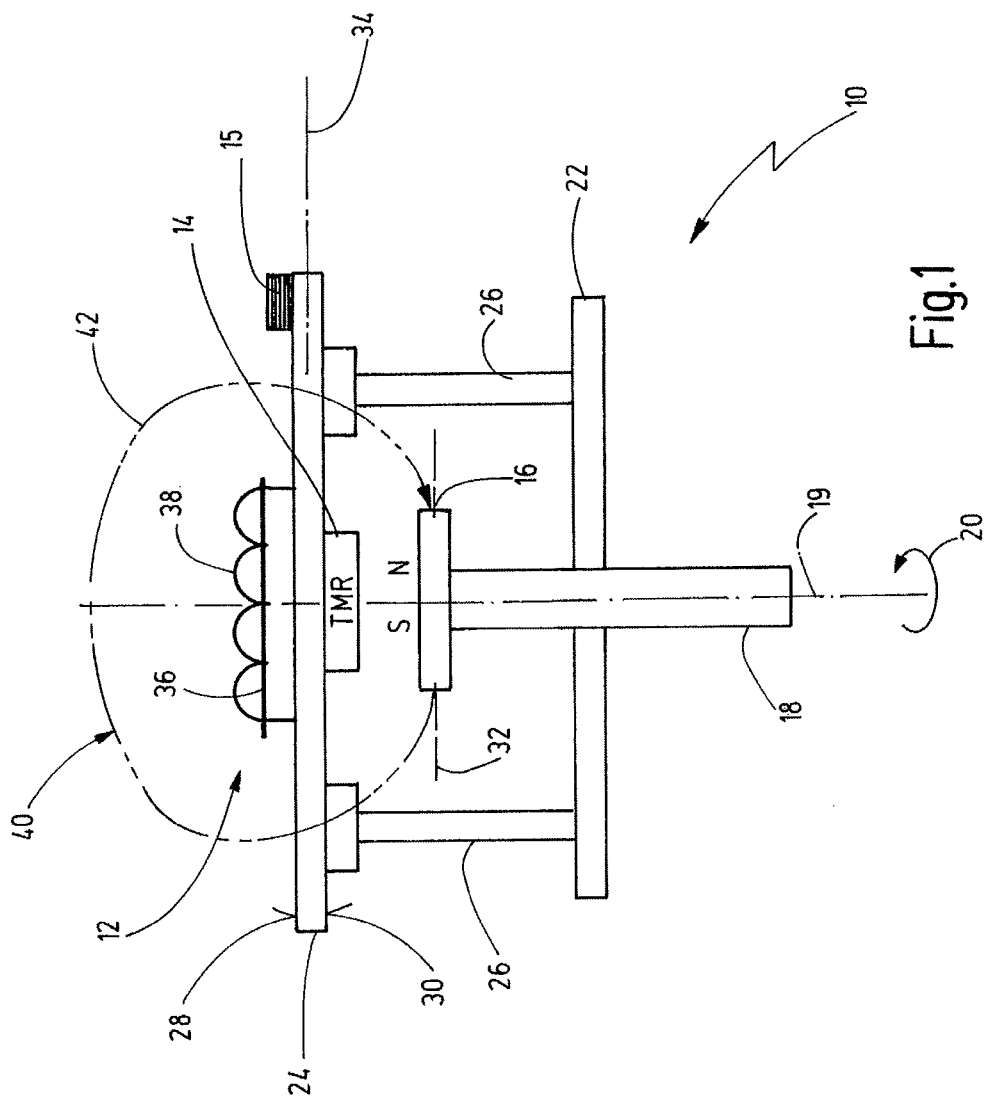
FIG. 1 shows a multiturn rotary encoder.

FIG. 1 shows a drastically simplified illustration of an MT rotary encoder 10. The MT rotary encoder 10 comprises a pulse-wire sensor 12 (e.g., a Wiegand wire sensor), a magnetic-field sensor (particularly an xMR element 14) and an evaluation logic, or evaluation unit 15. The mode of operation of the pulse-wire sensor 12, or a Wiegand wire sensor, is sufficiently known from the above-mentioned documents. In this context it is particularly referred to the document DE 34 08 478 C1.

The MT rotary encoder 10 cooperates with an excitation magnet 16 which is preferably a permanent magnet, in particular in terms of a dipole, being mounted in a rotationally fixed manner to an encoder shaft 18 for rotating together with the encoder shaft 18 about a rotational axis 19. The excitation magnet 16 and the encoder shaft 18 can rotate clockwise or counterclockwise. In FIG. 1 the encoder shaft 18 rotates counterclockwise as indicated by a rotational direction 20. The encoder shaft 18 belongs to an external device, or couples to the external device which is not depicted here and rotation of which is to be measured. The encoder shaft 18 can be supported rotationally in a housing 22 of the MT rotary encoder 10 by means of shaft bearings, which are not shown. Optionally, a so-called "KIT encoder" is also possible which is not supported and comprises two components (stator and rotor). The housing 22 is shown only partially in FIG. 1 and can be connected, for example, to a circuit board 24 via distance pins 26. The pulse wire sensor 12 can be arranged on a top side 28 of the circuit board 24. The xMR element 14 can be arranged on a bottom side 30 of the circuit board 24. It is clear that the pulse wire sensor 12 and the xMR element 14 can change their positions, or can both be arranged on the same side 28, or 30, of the circuit board 14. The sensor 12 and the element 14 can also be mounted to another component of the MT rotary encoder 10. Further, in FIG. 1 an exemplary centric (coaxial) arrangement of the encoder shaft 18, the excitation magnet 16, the xMR element 14, and the pulse-wire sensor 12 is shown. These components 12-18 are distanced to each other in an axial direction of the encoder shaft 18. This type of arrangement has a particular advantage in case a permanent magnet, which is a dipole, is used as the excitation magnet 16 which is arranged and rotates in a rotational plane 32 being orientated perpendicular to the rotational axis 19. It is clear that the orientation of the rotational plane 32 can slightly deviate by some degrees from a 90° orientation relative to the rotational axis 19 without limiting the mode of operation of the invention, which will be described below. The rotational plane 32 is in this case still orientated substantial perpendicular relative to the rotational axis 19.

Further, in FIG. 1 a mounting plane 34 of the sensor 12 and the xMR element 14 is shown which is arranged parallel to the rotational plane 32 and which extends through the circuit board 24. Even if the orientations enclose a (small) angle of some few degrees they will be considered hereinafter as being substantially orientated in parallel. The xMR element 14 and the pulse-wire sensor 12 are arranged in parallel relative to the mounting plane 34 (circuit board 24).

The pulse wire sensor 12 comprises a pulse wire, in particular a Wiegand wire 36 (hereinafter also briefly designated as "wire"), which is surrounded by a coil 38 and which is arranged in parallel to the mounting plane 34 in FIG. 1. The orientation of the pulse wire sensor 12 depends on the orientation of an external magnetic field 40 which generates a remagnetization pulse in the pulse wire 36 for the exclusive purpose of gaining energy and which is used in the xMR element 14 for determining a field strength and field direction. In FIG. 1 the excitation magnet 16 is used as one single component for both energy generation in the sensor 12 and determination of an absolute rotational angle (ST rotational angle) by means of the element 14. The energy is obtained by means of the pulse wire sensor 12. The absolute rotational angle is determined on the basis of a signal which is generated in the xMR element 14. It is clear that a number of spatially separated magnets, also magnets having several poles, can be used for allowing generation of the energy separately from the determination of the absolute rotational angle, as will be explained hereinafter in more detail. For the sake of a simplified description hereinafter it is assumed that only, the preferably bipolar, excitation magnet 16 is used for both purposes.

The xMR element 14 is physically built on the magneto-resistive effect and is typically realized by a, preferably one single, TMR element. The xMR element 14 is a component comprising two ferromagnetic layers separated from each other by a thin isolating layer. If the isolating is sufficiently thin (typically a few nanometers) electrons can "tunnel" between the two ferromagnetic layers. This is a quantum-mechanical phenomenon. It is substantially distinguishes between the anisotropic magneto-resistive effect (AMR effect) and the gigantic magneto-resistive effect (GMR effect). The xMR element 14 can also be realized by a, preferably one single, GMR element or AMR element.

In the description below the following aspects of the pulse wire 36 can be relevant:

The pulse wire 36 typically comprises a tough-magnetic jacket 46 and a soft-magnetic core 48 (FIG. 2A). The jacket 46 and the core 48 can be magnetized differently. Basically, there are three magnetization constellations, namely one including an identical orientation and two including opposite orientations. Due to the shape anisotropy the materials of the jacket 46 and the core 48 respectively have only one Weiss domain, and thus hysteresis curves exist which are almost rectangular.

The pulse wire 36 is a bistable magnetic element.

An outer magnetic field of a specific strength (coercivity) having a direction of magnetization opposite to the pulse wire 36 causes the direction of magnetization of the pulse wire 36 to flop-over abruptly (Wiegand effect).

This change of magnetic flux induces in the coil 38 a short electrical (remagnetization) pulse, roughly lasting 20 µs.

The energy content of such a pulse typically is in the range of 40 to 150 nWs and depends on a length of the pulse wire, characteristics of the coil 38, load resistances and the like.

Length of the pulse and energy content of the pulse are as far as possible independent of the velocity of change and the direction of the external magnetic field 40.

A "symmetrical mode of operation" generates from the remagnetization positive and negative voltage pulses in the coil 38 during a change of the polarity and field strength of the external magnetic field 40. The symmetrical mode of operation is present if the external magnetic-field strength 40 is sufficient for remagnetizing first the core 48 and then the jacket 46 and for bringing the pulse wire 36 into the magnetic saturation.

An "asymmetrical mode of operation" generates only voltage pulses of constant polarity while the polarity and field strength of the external magnetic field 40 changes. The asymmetrical mode of operation is present if the magnetic-field strength is sufficient only for remagnetizing the core 48 but not the jacket 46. In the present case substantially the symmetrical mode of operation is used.

A Wiegand sensor comprises a Wiegand wire and a coil. The terms "ignition field strength", "ignition threshold" or "trigger threshold" are to be understood hereinafter as a respective external magnetic-field strength which is required for remagnetizing the core 48, or the jacket 46, of the wire 36. In the following, this will also be designated as "flopping-over" the magnetic orientation of the core 48, or the jacket 46.

With reference to FIG. 2A the above-mentioned "remagnetizing" and "flopping-over the magnetic orientation(s)" will be explained hereinafter on the basis of three states Z1-Z3 of the wire 36 which is depicted as a longitudinal section through the wire 36. The jacket 46 completely surrounds the inner core 48. A magnetic field direction within the jacket 46 and within the core 48 is shown by means of arrows 44. In the state Z1 the magnetic field lines 42 of the outer magnetic field 40 are orientated (cf. FIG. 1) in the same direction as the field direction 44 within the wire 36. In the state Z2 the direction of the outer field 40 is reversed and has become so strong that the field direction 44 within the core 48 flops-over, whereas the strength of the external magnetic field 40, however, is not yet sufficient for reversing the field direction 44 of the jacket 46 as well, i.e. to remagnetize the jacket 46. In the state Z3 the outer magnetic field 40 is still orientated like in the state Z2, but has become so strong in the meantime that even the jacket 46 is remagnetized.

FIG. 2B shows a table illustrating exemplarily possible (remagnetization-) pulse variations in a simplified manner.

Starting in the state Z1 the outer magnetic field 40 causes the magnetizing direction 44 of the core 48 to abruptly flop-over (Wiegand effect) when reaching a specific strength (coercivity of the core) having a magnetizing direction opposite to the wire 36 (i.e. the outer field 40 is directed from the right to the left). Then, in the coil 38 (cf. FIG. 1) a large energy-rich (remagnetization) pulse 52, or 52', is generated as will be explained once again hereinafter with reference to FIG. 4A, because the core 48 flops-over (variation 1) against the field direction of the jacket 46. If the strength of the outer magnetic field 40 would then be increased continuously, so that the orientation of the outer magnetic field 40 is maintained and the strength is increased steadily, also the jacket 46 would flop-over towards the field direction 44 of the core 48, as shown in the state Z3. The flopping-over of the jacket 46 parallel to the core 48 results in a small remagnetization pulse which is hardly measurable (variation 3). However, if the direction of the outer magnetic field 40, starting from the state Z2, is reversed before the state Z3 is reached, then the core 48 flops back towards the jacket 46 into the state Z1 (variation 2) resulting in an average remagnetization pulse (not shown in FIG. 4A) which comprises significantly less energy than the pulse of the variation 1.

In the "symmetrical mode of operation" the coil 38 generates positive and negative voltage pulses during a change of the polarity and field strength of the external magnetic field 40. During the remagnetization of the core 48 opposite to the magnetic direction a relatively large pulse 52, or 52', having a high energy content is formed. During the flopping-over of the jacket 46—while the rotation of the excitation magnet 16 is continued in the same rotational direction—only a relatively small pulse is formed (variation 3), which cannot be used further due to a very small energy content thereof. With the variation 2 the core 48 flops back towards the jacket 46 since the rotational direction of the encoder shaft, and thus the polarity of the external magnetic field 40, starts to change before the jacket 46 can also flop-over towards the core 48 (variation 2). The variation 2 is a rather rare event which, as a rule, only happens if the reversal of the sense of rotation 20 of the encoder shaft 18 occurs immediately during or after a remagnetization pulse 52, or 52', according to the variation 1, namely before the state Z3 starts if the sense of rotation is continued theoretically.

FIG. 3 shows a block diagram 60 of the MT rotary encoder 10 of FIG. 1. In a block 62 the energy is generated and, if necessary, stored which is required for the signal evaluation and processing, particularly for counting the 360° revolutions. The block 62 can comprise a rectifier 64 for rectifying identically each of the remagnetization pulses 52 and 52' which are obtained during one 360° revolution and which comprise opposite polarities. The energy generated by one remagnetization pulse 52, or 52', which typically is 40 to 150 nWs, can be buffered within an energy-storage device 66 (e.g., within a capacitor 67). The energy gained, however, is extremely small if revolution counting is to be conducted therewith, while an external supply of energy is and will be kept turned off. This means that for the entire revolution-counting process only the energy of the remagnetization pulse 52 is available.

Another block 70 is used for the signal generation, signal evaluation and storage of relevant data such as for storing the number of complete 360° revolutions and a quadrant history, which will be explained hereinafter in more detail. The block 70 comprises, for example, the xMR element 14, the evaluation unit 15, an (optional) comparator 72 (e.g., Schmitt trigger), and a storage element 74. The storage element 74 can comprise a revolution counter 76 and a (history) memory 78. It is clear that the storage element 74, the revolution counter 76, and/or the history memory 78 can also be integrated into the evaluation unit 15. The evaluation unit 15 can also have integrated the rectifier 64. The evaluation unit 15 can be realized, for example, in terms of a microcontroller or an ASIC chip. The pulse wire sensor 12 is preferably formed as a Wiegand sensor. The xMR element 14 preferably is high resistive for reducing the energy consumption as far as possible.

In order to be able to realize a simple, cheap and component-efficient solution the concept, which will be explained hereinafter, can be selected.

The pulse wire sensor 12 is exclusively used as an energy generator, and each information required for revolution counting and fine-position determination are derived from only one single component which is realized in the present case by the xMR element 14.

One solution which uses, as proposed in the prior art, a Hall sensor instead of the xMR element 14 is basically not excluded in the arrangement, or in the combination, shown in FIG. 3 but does not lead to the goal due to the following reasons, i.e. not to an energy-self sufficient solution for the revolution. A Hall sensor, in comparison to an xMR element, is a complex circuitry typically having a relatively long attack time after turning on the external supply voltage. The attack time is caused, amongst other things, by the Hall sensor requiring a controlled operating voltage. During this attack time, however, the energy gained by the pulse wire sensor 12 can be significantly decreased, for example, by leakage currents or self-discharge of the capacitor 67, and thus additional demands on the remaining circuit are significantly tightened due to an energy absorption allowed at maximum. In general, a fine-resolving single turn sensor (ST sensor), in this case the Hall sensor, requires a signal of high-grade quality having a high signal-noise distance for allowing generation of a high resolution of typically ≥8 bit/360°-revolution. However, since only the energy of one remagnetization pulse (40 to 150 nWs) is available the multiturn rotary encoder (MT rotary encoder) 10 uses an ST sensor (xMR element 14) which requires extremely little energy but still delivers a good signal. Since the evaluation signal available from a Hall sensor, i.e. the Hall voltage, is substantially determined by the product of the current intensity and the magnetic induction the Hall sensor cannot fulfill both requirements (signal of high-grade quality and less energy consumption at the same time) at a default magnetic induction due to the operational principle. Therefore, the inventors of the present invention have recognized that a (high resistive) ST sensor (such as the xMR element 14) is to be used. Of all known physical effects changing an electric characteristic in a solid due to magnetism the MR technology is to be emphasized particularly. The MR effect already delivers a signal having a very good signal-noise relationship at weak magnetic fields. Although the diverse MR technologies (such as AMR, GMR, TMR) are built on different effects, they have the following in common:

Resistance thereof is changed dependent on the external magnetic field.

The xMR sensors typically are realized by simple passive resistance (half) bridges delivering (almost immediately) a signal, which can be evaluated, after supply voltage is turned on, i.e. without inertia.

Due to a corresponding structure they can be formed in a high-resistive manner.

The utilization of a high resistive xMR element 14 as ST sensor also has advantages. During the operation of the MT rotary encoder 10 without external energy supply the energy which is required for the determination of the number of 360° revolutions is gained from the mechanical movement of the encoder shaft 18 and the rotation of the excitation magnet 16. The pulse wire sensor 12 (which is preferably operated symmetrically) generates during passage of the, preferably bipolar, excitation magnet 16 through a 360° position respectively one positive and one negative remagnetization pulse 52 and 52', as exemplarily shown in FIG. 4A.

In FIG. 4A a course 50 of the external magnetic field 40 in accordance with FIGS. 1 and 3 is shown. The course 50 of the magnetic field 40 is reflected by a signal course 51 of the xMR element 14. In FIG. 4A the two courses 50 and 51 are on top of each other. In the following it is assumed that the 360° revolution has its physical zero passage at the point P0. The strength of the external magnetic field 40 in the point P0 is maximally positive during positive orientation of the field 40, whereas the strength is almost zero after rotation of the encoder shaft 18 about 90°, and is maximally negative after an additional rotation about 90° in the same direction.

In the following it is assumed that the encoder shaft 18 rotates such that the signal course 51 runs from the left to the right in FIG. 4A. Hence, a "zero passage" of the external magnetic field 40 occurs if the encoder shaft 18 has rotated about 90°. A "zero passage of the revolution counting process" typically corresponds (in terms of evaluation logic) to one of the remagnetization pulses 52, the relative (angular) position thereof will be explained in more detail hereinafter. The phase difference of the different "zero passages" requires for the revolution counting and the determination of a fine-resolved position (i.e. an absolute rotational angle within one 360° revolution) conduction of a synchronization, which will be explained also in more detail below.

Hence, if the sine curve (course 50 and 51) runs from the left to the right in FIG. 4A, then the polarity of the outer magnetic field 40 in the 90° position of the encoder shaft 18 is reversed and the field strength in this case reaches a trigger threshold T−, at which a first large remagnetization pulse 52-1 (cf. variation 1 in FIGS. 2A and 2B) is generated. After another rotation about 180° a second oppositely polarized remagnetization pulse 52-2 is generated at a trigger threshold T+. The trigger threshold T+ and the trigger threshold T− correspond to ignition thresholds 54-1 and 54-2 of the core 48, which are indicated by horizontal dashed lines in FIG. 4A. The number of two remagnetization pulses 52 for each 360° revolution is caused by the fact that the excitation magnet 16 is bipolar. If a quattropole were used, 4 pulses 52 for each 360° revolution were obtained. With a signal course 50 and 51 the remagnetization pulses 52-1 and 52-2 are located, from the left to the right, in so-called quadrants Q2 and Q4. In FIG. 4A one complete 360° revolution is sectionalized, for the sake of evaluation, into four equally sized quadrants Q1-Q4 so that each of the quadrants Q1-Q4 covers an angular area of 90°. It is clear that the hereinafter given explanations on the basis of a 90°-sized quadrant are only of an exemplary nature. In the same way it is possible to convert the "quadrants" into 45°-sized or 120°-sized segments, which in turn would make the evaluation more complex.

During the designing of the MT rotary encoder 10 it should be considered that the remagnetization pulses 52 are substantially arranged centrally (45+/−10 degree) in the quadrants Q1-Q4. If the rotary-encoder shaft 18 is rotated in a reversed direction, so that the sine curve of FIG. 4A runs from the right to the left, remagnetization pulses 52'-1 and 52'-2 arise, which are shown in FIG. 4A by means of a solid line. The remagnetization pulses 52' are located in the quadrants Q1 and Q3, whereas the remagnetization pulses 52 are located in the quadrants Q2 and Q4. In addition, FIG. 4A clearly shows that the remagnetization pulses 52 can be offset be some degree relative to the respective quadrant center of 45°. The relative position of the remagnetization pulses 52 and 52' is substantially caused by the spatial (angular) orientation of the pulse wire sensor 12 relative to the xMR element 14. Additional factors, which have an impact on the relative position of the remagnetization pulses 52 and 52', are to be seen, for example, in the field strength of the excitation magnet 16, sensitivity of the pulse wire sensor 12, the extent of the distance between the excitation magnet 16 and the pulse wire sensor 12, selection of the tough-magnetic and soft-magnetic materials of the jacket 46 and the core 48, and the like.

Since the remagnetization pulses 52 and 52' are substantially located centrally within the associated quadrants Q1-Q4, the MT rotary encoder 10 obtains a maximum bandwidth of tolerance of ±45° between an angular position of the pulse wire sensor 12 and the xMR element 14 (cf. also FIG. 1), and thereby facilitates mounting of the corresponding components (at the manufacturer's end), and is stable over wide ranges of temperatures as well.

If the evaluation described below refers to quadrants it is advantageous if the remagnetization pulses 52 and 52' respectively are located unambiguously within one of the quadrants Q1-Q4. Caused by the switching hysteresis of the pulse wire sensor 12 the pulses 52 and 52' are respectively located in an adjacent quadrant, while the encoder shaft 18, or the excitation magnet 16, rotates to the right or to the left. Thereby, together with a (stored) history of previously passed quadrants, an unambiguous differentiation between a rotation to the right (Q2-Q4-Q2- . . . and so on) and a rotation to the left (Q1-Q3-Q1- . . . and so on) is possible. In the example of FIG. 4A this means that the rotation to the right can be recognized by, for example, the remagnetization pulses 52 in the quadrants Q2 and Q4, whereas the rotation to the left can then be recognized by the remagnetization pulses 52' in the quadrants Q1 and Q3. With this embodiment no conclusions can be drawn from the polarity of the remagnetization pulses 52 and 52' since they are conducted over the rectifier 64 for the purpose of buffering energy, and buffered in the capacitor 67, if necessary. Then the capacitor 67 supplies the other circuit blocks such as the evaluation electronics 15, the xMR element 14, the comparator 72, and the storage element 74 with an operating voltage Vdd resulting therefrom.

Figure 4B:
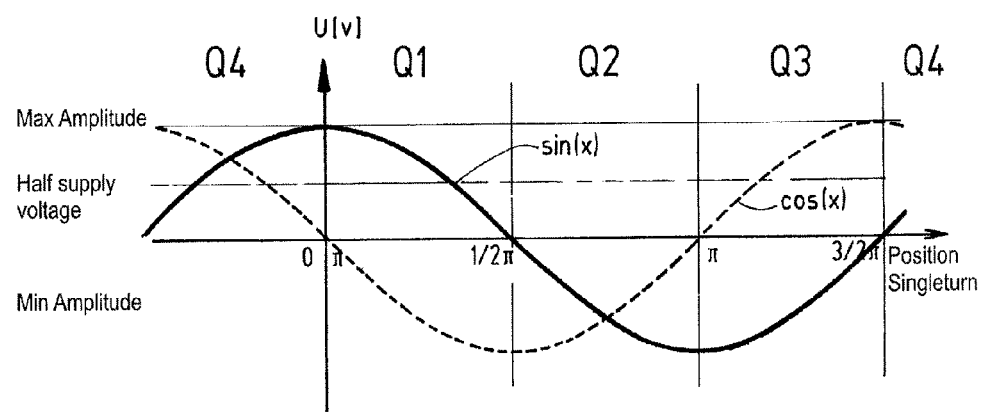
FIG. 4B shows sine and cosine output signals of an xMR element.

In FIG. 4B the sine curve (cf. solid line) of FIG. 4A is shown once again which corresponds on the one hand to the course 50 of the magnetic field and on the other hand to the course 51 of the sine-output signal of the xMR element 14. The dashed line shown in FIG. 4B corresponds to a course of a cosine-output signal of the xMR element 14. The quadrants Q1-Q4 correspond to four 90° angular areas of the sine-shaped magnetic field 40 during rotation of the encoder shaft 18, or the excitation magnet 16. If the xMR element 14, which measures 360°, is orientated correspondingly the sine course corresponds simultaneously to the course of the output voltage of a bridge circuitry (here sine signal) of the xMR element 14. Then the second bridge circuitry delivers the associated cosine of the signal. Thus, the four quadrants Q1-Q4 can also be interpreted as the two MSB (Most Significant Bits) of a ST-fine position (absolute rotational angle).

Immediately after one of the remagnetization pulses 52 or 52' has occurred the evaluation unit 15 is ready. Due to the energy gained from the pulse the position (strength of the external magnetic field 40) of the xMR element 14 can be inquired by the evaluation unit 15, thereby allowing deriving subsequently the direction of the magnetic field 40. The same applies with regard to the quadrants Q1-Q4, in which one pulse 52, or 52', has been triggered last. A history (temporal sequence) of the passed quadrants can be stored in the history memory 78 (cf. FIG. 3). A value (number of 360° revolutions up to now) of the revolution counter 76 is inquired by the evaluation unit 15. This means that the evaluation unit 15 asks for, or reads out, an old status (history of the last stored quadrants as well as the value of the revolution counter 76) from the storage element 74. This information (last stored quadrant from the history and current quadrant of the xMR element 14) allows conducting one of the following actions in an unambiguous manner:

updating the quadrant history only;

incrementing the revolution counter (presently by one half-revolution) and updating the quadrant history; or decrementing the revolution counter (presently by one half-revolution) and updating the quadrant history.

Subsequently, the status (quadrant history and revolution-counter value or revolution-counter reading) is updated in accordance with the new data, and the updated data is again stored in the storage element 74.

The comparator 72 in the operational block 70 of FIG. 3 is only provided optionally in case that a level of the xMR element 14 is not sufficient for further processing the same by the evaluation unit 15 directly.

If an external energy, additionally to the energy of the remagnetization pulses 52 and 52', is available the MT rotary encoder 10 cannot only realize the above-described revolution-counting function but can also determine an unambiguous position by determining a fine-resolved position (absolute rotational angle) of the ST sensor (xMR element 14). For this purpose the evaluation unit 15 can be fed directly by the sine and cosine signals (cf. FIG. 4B) of the xMR element 14 which can be processed to an absolute rotational angle (value between 0° and 360°) there. For example, this can be conducted in accordance with conventional methods such as an arctan calculation or by means of a Cordic algorithm.

During the formation and later output of the unambiguous position (sum of the absolute rotational angle and number of complete revolutions) it is to be considered that the zero passages are not identical. Without the synchronization of information the associated overall position output would not be steady. However, the synchronization of information can be realized on the basis of the ST-fine position, which is determined during the turning on of the external operating voltage, and on the current quadrants derived therefrom, as well as on the quadrants stored last (history of the last stored quadrants and the revolution-counter value). A specific correcting value for determining the exact and steady overall position from the ST and MT raw data can be assigned to a respective information formed thereof.

During the operation of the MT rotary encoder 10 with an external voltage supply the number of the complete 360° revolutions can be determined, also without the revolution counter 76, based on the determination of passed zero passages of the ST sensor (xMR element 14). Thereby also the synchronization can be omitted since the zero passage is in this case identical for the ST sensor and the revolution counter. During a high dynamic operation of the MT rotary encoder 10 a better real-time skill is achieved thereby, since the computing expenditure for the synchronization is completely omitted and only comes up once after the turning on of the external supply voltage.

Further, it is also possible to image the revolution counter on the one hand through the pulse-wire sensor 12 and on the other hand simultaneously through the zero-passage counting of the ST sensor. Thereby a redundant system having high reliability and a self-monitoring option is obtained.

The ST data can optionally be enhanced further with regard to resolution and accuracy by using, for example, an AMR sensor (not shown) measuring over 180° additionally to the TMR element measuring 360°. This AMR sensor has, based on its principle, a resolution which is greater by a factor 2 (hence one bit), and shows particularly good values with regard to the signal-noise distance of the noisy hysteresis. The mounting can be done, for example, on the circuit-board side 28 (cf. FIG. 1) which is arranged oppositely to the xMR element 14 beneath the pulse wire sensor 12.

Some advantages of the MT rotary encoder 10, which has been shown up to now, are:

- Only few pulse wire sensors 12 and one single excitation magnet 16 are compellingly needed.
- An additional specific Hall switch for determining a polarity of the external magnetic field 40 and/or the polarity of remagnetization pulses is not required since the polarity of the magnetic field does not play any role with the present solution approach.
- The ST sensor (xMR element 14) delivers, as one single unit, each information required for counting revolutions, namely directly during detection of the ST position, wherein an additional circuitry effort is eliminated and the entire costs are lowered. As mentioned above, it is not necessary, for example, to detect and store the polarity of the remagnetization pulses 52 and 52' as well as the polarity of the magnetic field.
- The MT rotary encoder 10 allows, due to the quadrant-related evaluation thereof, high mounting tolerances and is stable over wide ranges of temperatures.
- The MT rotary encoder 10 provides a solution which does not only image a revolution counter but also is a low-cost solution for an overall encoder system comprising an ST, MT, and a simple and cheap synchronization unit.
- The MT rotary encoder 10 is energy-self-sufficient and does not require any support battery for storing data while the external voltage supply is turned off.
- The MT rotary encoder 10 does not comprise any components, which are submitted to wear such as a transmission gear system, and any high-sensitive components either such as a glass pane.
- Expensive flux-conducting pieces are not required for the pulse wire sensor 12.
- For determining the quadrants Q1-Q4, in the simplest case, the two MSB of ST dataword are considered. They can also be formed simply by digitizing the sine and cosine signals of the xMR element 14. Alternatively, the ST position can be determined more accurately by a low-power AD converter. Thereby, the quadrants Q1-Q4 can be learned by means of software with regard to the position relative to the remagnetization pulses 52 and 52' during the installation phase. Thereby, maximum tolerance range of ±45° is obtained, namely independent of a real mounting tolerance, or a default relative position of the xMR element, which might be unfain advancele, relative to the pulse-wire sensor 12 can be corrected by means of software in order to allow an extreme miniaturization as well.
- Optionally, a very high resolving and accurate MT rotary encoder can be realized by using an additional xMR element.

With utilization of a 180°-measuring AMR sensor, instead of a 360°-measuring TMR sensor as xMR element 14, optionally an additional quadripole or multi-pole magnet, instead of a dipole, can be used as the excitation magnet 16 for the activation of the pulse wire sensor 12, which in this case is typically arranged radially displaced. In this manner the same system principle can be applied which in this case does not only count half-revolutions but, for example, corresponding quarter-revolutions.

Of course, the presently suggested solution concept can be transferred to linear measuring systems.

The evaluation logic is based on low-power technology. The evaluation unit 15 can be realized discretely in terms of an FPGA, microcontroller, or ASIC.

Preferably, the storage element 74 is a low-power data memory, such as an FRAM. Other technologies such as MRAM and the like can also be used.

Figure 5:
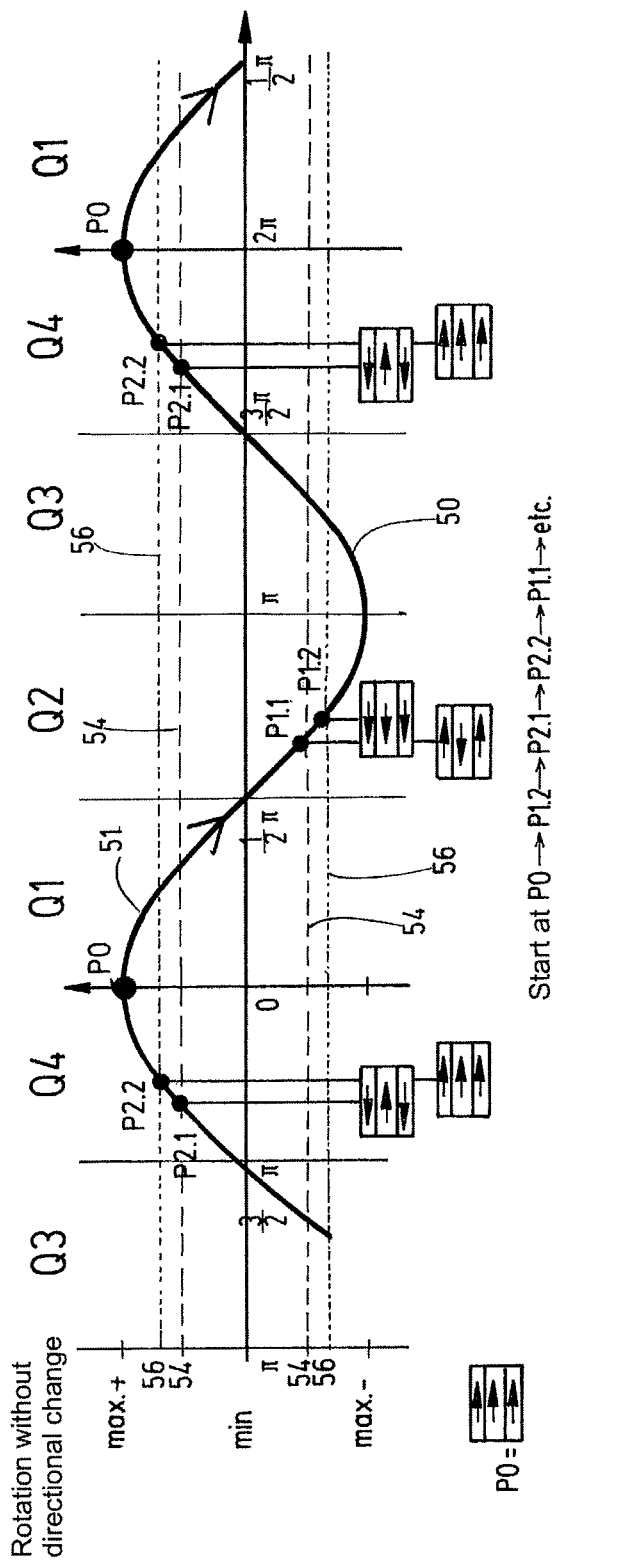
FIG. 5 shows critical points in a signal without directional changes.

With reference to the FIGS. 5 and 6 a way is hereinafter shown for determining the (overall) position of the encoder shaft 18 unambiguously, safely, and reliably. FIG. 5 exemplarily shows normal operation without changing the sense of rotation 20 (cf. FIG. 1). This means that any reversed operation is performed which results in a directional change of the sense of rotation 20 of the encoder shaft 18. This normal operation is not critical and always provides unambiguous information ensuring an (absolute) value of the revolution counter 76 (cf. FIG. 3). Then, based on FIG. 6, a special case will be explained also exemplarily, which might result in a wrong count (of the quadrants), and thus in a loss of the absolute position. This special case occurs if a directional change occurs while the pulse wire 36 is located between the states Z2 and Z3 of FIG. 2A.

With reference to FIG. 5 again the sine-shaped course 50 of the magnetic field of FIGS. 4A and 4B is shown which is present at the location of the pulse wire sensor 12 while the encoder shaft 18, or the excitation magnet 16, is continuously rotated without a directional change. The amplitudes of the strength of the external magnetic field 40 are "max.+" and "max.−". In the same way the ignition threshold 54 of the core 48 and an ignition threshold 56 of the jacket 46 of the pulse wire 36 are shown in terms of horizontal reference lines at which the magnetization, and the field direction 44 (cf. FIG. 2A) of the core 48 and the jacket 46 respectively, flops towards the applied external magnetic field 40. For the purpose of a simplified understanding of the hereinafter given explanations a respective magnetization of the core 48 and the jacket 46 and specific points Px.x of the magnetic field course 50 and the signal course 51 are shown. Q1 to Q4 designate the 90°-quadrants of one complete 360°-revolution, and also represent the above-mentioned two MSB of the fine-resolving ST sensor.

When in FIG. 5 the bipolar excitation magnet 16 rotates in a fixed direction, starting at the zero passage (P0) steadily without directional change, so that the sine curve always runs from the left to the right the pulse wire 36 is submitted to the illustrated sine-shaped magnetic-field strength and polarity. In this context, the points P0, P1.1, P1.2, P2.1, P2.2 are passed one by after the other in a repeating manner. The points P1.1, P1.2, P2.1 and P2.2 correspond to remagnetizations of the core 48 (P1.1 and P2.1) and of the jacket 46 (P1.2 and P2.2). In this case the core 48 and the jacket 46 adapt the respectively illustrated field directions 44 (illustration analogue to FIG. 2A) in these points. During passage of the ignition thresholds 54 of the core 48 respectively one energy-rich large pulse 52 (cf. variation 1 in FIG. 2B) is delivered by the pulse-wire sensor 12 (cf. FIG. 4A) which has a positive or negative sign character dependent on the polarity of the external magnetic field 40. These remagnetization pulses 52-1 and 52-2 are then used in accordance with the above-described method for the (voltage) supply in order to count the complete 360° revolutions, while an external voltage supply (not shown in the figures) of the MT rotary encoder 10 is turned off. The relatively small and energy-poor pulses (cf. variation 3 in FIG. 2B), which are generated when the ignition thresholds 56 of the jacket 46 are reached, cannot be used since they do not have sufficient energy for signal evaluation.

Figure 6:
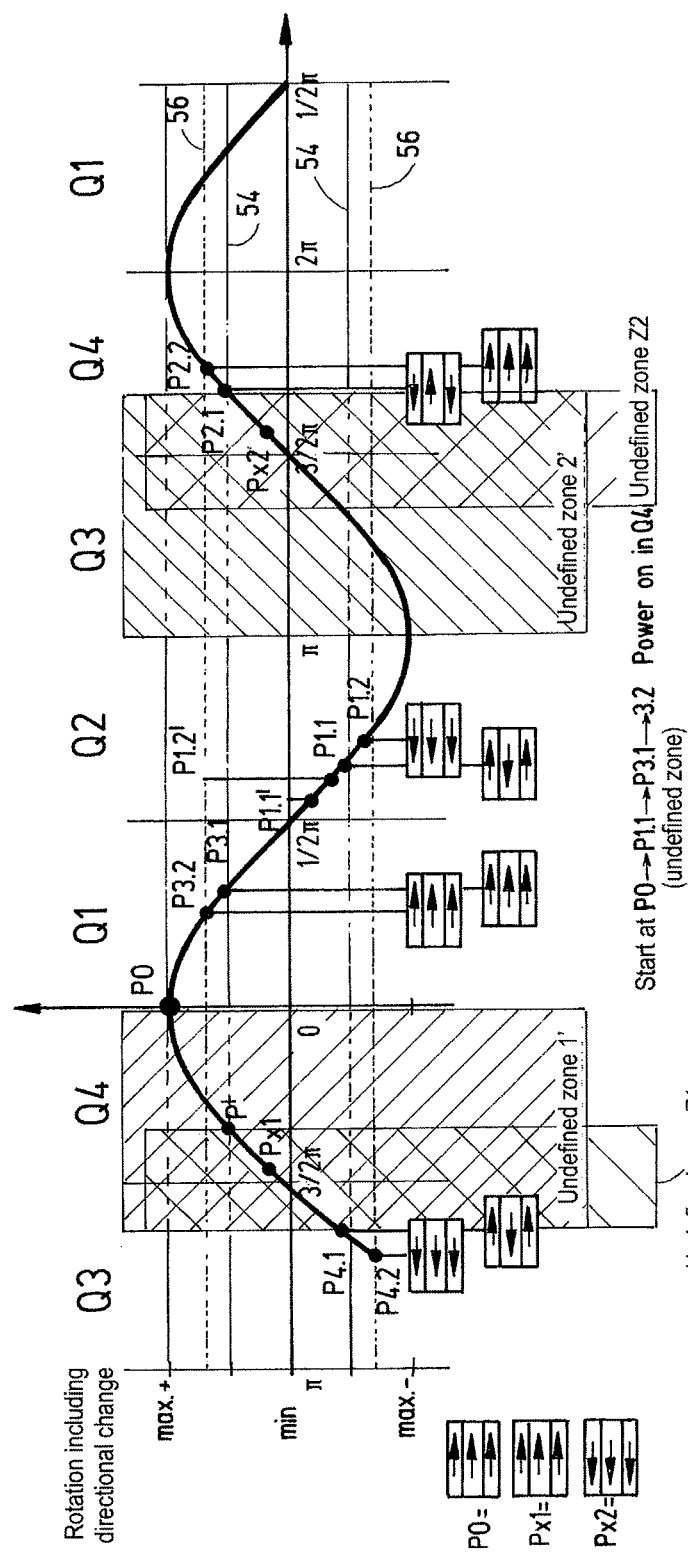
FIG. 6 shows critical points in a signal including a directional change and undefined zones.

With reference to FIG. 6 one of several possible special cases is shown during which the counting of the complete 360° revolutions is at first continued without an external voltage supply after a directional change occurs between P1.1 and P1.2. The external voltage supply is turned on when the encoder shaft 18 has passed less than roughly 180° after the reversal of direction so that the revolution counter 76 needs to be synchronized with the fine-resolving ST sensor (xMR element 14) in order to allow correct calculation of the overall position from the number of the 360°, or 180°, revolutions and from a current ST position (absolute rotational angle), not showing discontinuities. If the way is greater than 180° either the point P2.2 or P4.1 is exceeded which then delivers an unambiguous remagnetization pulse 52, or 52', which can be evaluated and assigned.

During the sequential passage of the points P0, P1.1, reversal of direction, P3.1, P3.2 including a subsequent stop in the quadrant Q4 or in an "undefined zone 1'" (Px1), wherein in the stop position the external voltage supply is turned on, the following sequence develops:

During rotation of the external magnetic field 40 from P0 to P1.1 the core 48 flops-over against the jacket direction and delivers, as desired, a large remagnetization pulse 52-1 (cf. FIG. 4A).

During an (instantaneous) subsequent rotation of the external magnetic field 40 in the opposite direction from P1.1 to P3.1 the core 48 again flops-over, but into the original jacket direction, which has not changed up to now, and thereby provides an (undesired small) remagnetization pulse (cf. variation 2 in FIG. 2B) including an average energy content which is energetically not sufficient for providing sufficient energy for a short period of time, which is required for counting the 360° revolution. The quadrant Q1 is not "observed" and not detected due to the average pulse height, as it were actually required for continuing the quadrant history safely and unambiguously.

During continued rotation (without additional directional change) from the point 3.1 over the point 3.2 (where the negligible small pulse according to variation 3 of FIG. 2B develops) up to the quadrant Q4 of FIGS. 4A and 4B, i.e. into the undefined zone 1', a problem arises, which is described hereinafter, if the rotation is stopped in the undefined zone Z1 in the point Px1 and the external voltage supply is turned on for the purpose of determining an unambiguous (overall) position of the encoder shaft 18.

The quadrant history, which is recorded in the history memory 78, of the subsequently passed quadrants Q1 to Q4, which is determined by means of the described short-term position inquiry (inquiry of the strength of the magnetic field) of the fine-resolving ST sensor if a remagnetization pulse 52 or 52' occurs serves on the one hand for updating the revolution counter 76 continuously during the lacking external voltage supply, and on the other hand for synchronizing the revolution counter 76 and the ST sensor (xMR element 14) when the external voltage supply is added. For this purpose at least two large pulses (according to variation 1 of FIG. 2B) are required without a gap for each 360° revolution in a (constant) direction for ensuring an uniqueness of the counting process. However, the pulse in Q1 is lacking.

In the situation just described the case occurs that after the turning on of the external voltage supply the ST position can be read unambiguously (cf. Px1 or Px2 in the respective quadrant Q4). The recorded history, in particular the last stored history value Q2, however, does not allow an unambiguous statement on whether the encoder shaft 18, and thus the excitation magnet 16, has been rotated lately about roughly 180° in the counterclockwise direction or in the clockwise direction. In both cases the ST sensor delivers the same external magnetic-field strength at Px1 and Px2. The cause for this inaccuracy is to be seen in that the remagnetization pulse of average size, triggered at P3.1, does not allow quadrant determination by means of the ST sensor because not enough energy is present.

Thus, false position determination—even if only temporary—in an order of ±180° after the turning on of the external supply voltage is possible so that the synchronization with the single turn is not free from error either. However, the position determination is only temporarily wrong since large remagnetization pulses according to the variation 1 (cf. FIG. 2B) are generated during the exceeding of the points P2.1 and P4.1, which pulses would trigger an update of the unambiguous information which was lost in the meantime. This means that, for purely counting complete 360° revolutions at an accuracy of ±180°, any correction measures need to be taken after the turning on of the supply voltage, if the encoder shaft 18 is not located in the undefined zones.

If the point P2.1 is exceeded, a large pulse is generated in the quadrant Q4 which allows the conclusion that the sine curve still runs from the left to the right. However, when the point 4.1 is exceeded, then a large pulse is generated in the quadrant Q3. Pulses in the quadrants Q1 and Q3 mean that the sine curve runs from the right to the left, i.e. change of direction has occurred if the last stored quadrant value was Q2.

The undefined zones Z1 and Z2 are caused by the ignition thresholds 54 of the core 48. The undefined zone Z1 extends at least from the point P4.1 to the point P', wherein the point P' corresponds to the point P2.1 in the subsequent cycle. The same is true for the undefined zone Z2, a minimal extension thereof reaches from the point P2.1 to the point P2', wherein the point P''' corresponds to the point P4.1 of a preceding cycle. If the hystereses are to be certainly considered in addition, which are caused, for example, by temperature fluctuations of the ST sensor, the right boundary of the undefined zone Z1 can be extended to the end of the preceding quadrant Q4 and the left boundary of the undefined zone Z2 can be extended to the left edge of the quadrant Q3 so that the undefined zones Z1' and Z2' are obtained.

There are different options to unambiguously determine the position of the MT rotary encoder 10 despite the problem illustrated in FIG. 6.

With a first solution approach the coil 38 of the pulse wire sensor 12 is supplied with current for a short time in order to generate, by means of the pulse-wire sensor 12, a response to the additional (test) pulse as an additional signal.

One distinguishing feature, which leads to an uniqueness with regard to the undefined zones Z1 and Z2, is the fact that the respective magnetization directions of the core 48 and the jacket 46 are different within the two zones Z1 and Z2 (cf. field directions 44 in FIG. 6 at Px1=P3.2 or Px2=P1.2).

In order to be able to extract this information the inventors propose the following procedure. Immediately after the turning on of the external supply voltage a short electrical (test) pulse having a default quadrant-dependent sign character and default energy is short-time coupled into the already existing coil 38. For this purpose, a corresponding circuitry block, which is not explicitly shown in FIG. 3, can be provided, for example, within the evaluation unit 15. If the current intensity of the test pulse is sufficient, an additional magnetic field, which either counteracts or amplifies the magnetization of the wire 36, is generated—beside the external magnetic field 40—in the coil 38. With a reverse magnetic direction of the coil 38 and with a suitable sizing of the additional field the magnetization of the core 48 abruptly flops-over and generates a short change of the magnetic field, which in turn generates a measurable electric pulse in the coil 38 (response pulse from which the additional signal is determined). If the period of the externally coupled-in electric test pulse is not dimensioned too long, then the response pulse of the wire 36 can be measured during the flopping-over. Dependent on whether or not a response pulse is generated (additional signal) an unambiguous conclusion can be drawn whether the encoder shaft 18 is located in the undefined zone Z1 or in the undefined zone Z2. In this manner the uniqueness of the revolution counter 76 can be restored. Thus, also the synchronization with the ST sensor, or the xMR element 14, is possible.

Figure 7A:
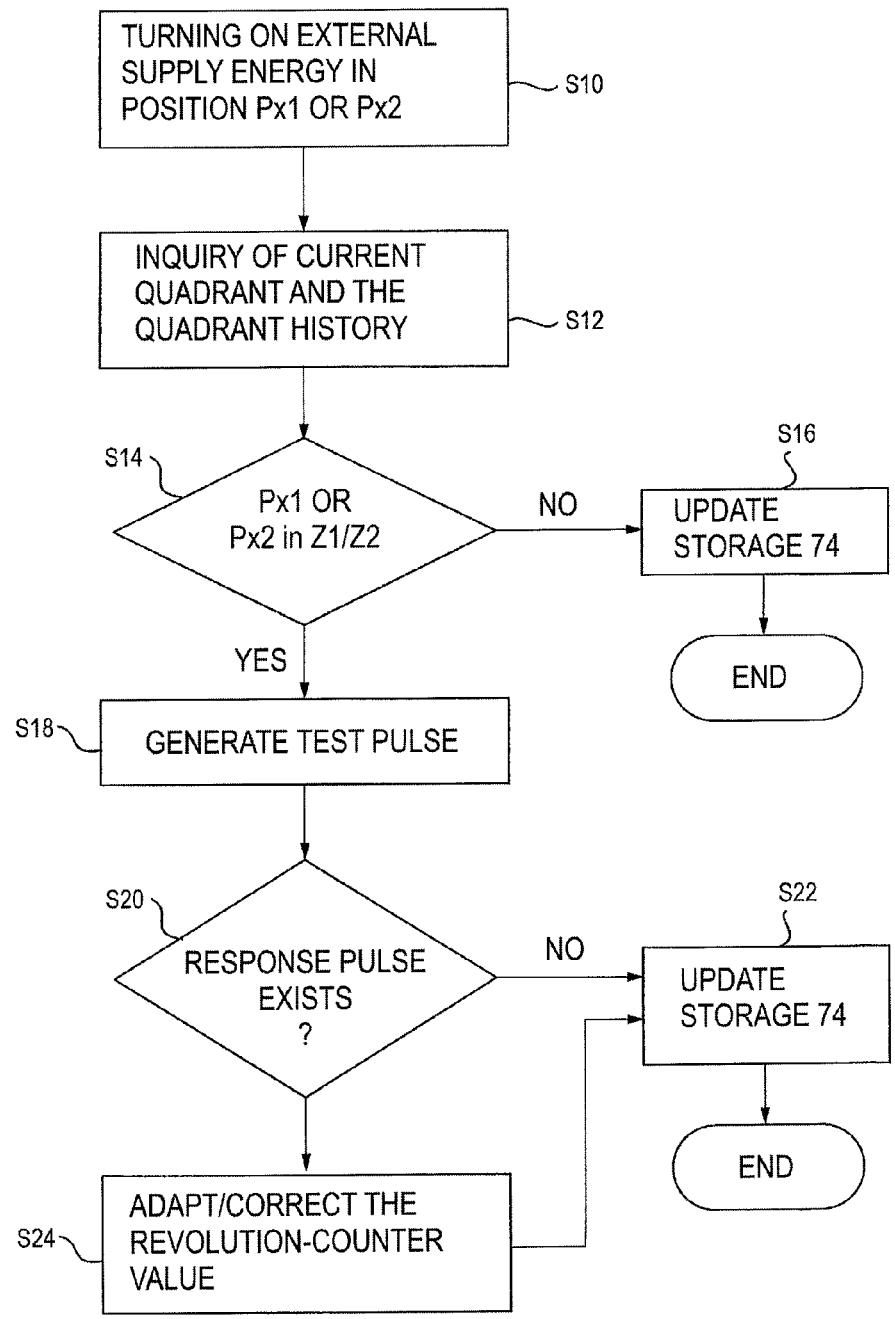
FIGS. 7A and 7B show flow charts of a method for determining an unambiguous position of a rotary shaft.

FIG. 7A shows a flow chart, which is based on the signal course of FIG. 6 as well as on the first solution approach (test pulse via coil 38). In this case it is assumed that the encoder shaft 18 passes, coming from the left, the point P0 and runs to the point P1.1 where the change of direction occurs before the point P1.2 is reached. Then the encoder shaft 18 is rotated so far that the curve runs to the left up to the point Px1 where the position of the encoder shaft 18 is inquired. It is to be considered that the encoder shaft 18 does not need to be stopped necessarily for the purpose of the inquiry. If an inquiry occurs in the point Px1 or Px2 (cf. FIG. 6) the MT rotary encoder 10 is turned on, i.e. supplied with external energy. This state is reflected in the flow chart of FIG. 7A in the step S10. As soon as the MT rotary encoder 10 is supplied with an external energy, the evaluation unit 15 can determine on the basis of the quadrant history that the encoder shaft 18 is located within the undefined zone Z1 or Z2. The last stored quadrant value is Q2 and has been obtained in the point P1.1.

Since the last stored quadrant of the history is the quadrant Q2, thereby immediately the undefined zone Z1 or Z2 is obtained which are equally sized and are congruent, in contrast to the zones Z1' and Z2'. The undefined zones Z1 and Z2 can vary with regard to different "last stored quadrants". Each of the quadrants can have assigned its own undefined zone. Therefore, these zones are stored, preferably in advance, in a read-only memory such as in the storage element 74 or in the evaluation unit 15.

In the step S14 it is inquired whether the strength of the external field, or the point Px1 or Px2, is located within the forbidden zone (Z1 or Z2) with regard to the quadrant Q2. If it is located outside the forbidden zone, the assignment between the measured value and the associated quadrant is possible without problems so that the unambiguous position (sum of absolute rotational angle and number of the completely passed 360° revolutions) can be determined if the quadrant history is additionally considered (step S16). However, if the inquiry of step S14 results in that the measured value is located in the undefined zone, in step S18 the above-mentioned test pulse is applied to the coil 38.

In this case it is inquired in a next step S20 whether a remagnetization pulse was triggered, in terms of a response pulse, due to the test pulse. If no response pulse was triggered, in step S22 the unambiguous position can be determined in the conventional manner (compare step S16). Otherwise, the value of the revolution counter 76 is incremented or decremented. The incrementing and decrementing at the step S24 depends on the current rotational direction 20 of the encoder shaft 18. In the step S24 the revolution counter 76 is adapted generally.

After the general adaptation of the revolution counter in step S26 the unambiguous position of the encoder shaft 18 can be determined analogously to the steps S16 and S22.

It is clear that the polarity of the additional to-be-generated magnetic field can also be recorded in advance, dependent on the last stored quadrant value of the quadrant history, in a suitable memory. Further it is clear that the response pulse, in terms of the additional signal, can be considered for the conventional evaluation.

Figure 7B:
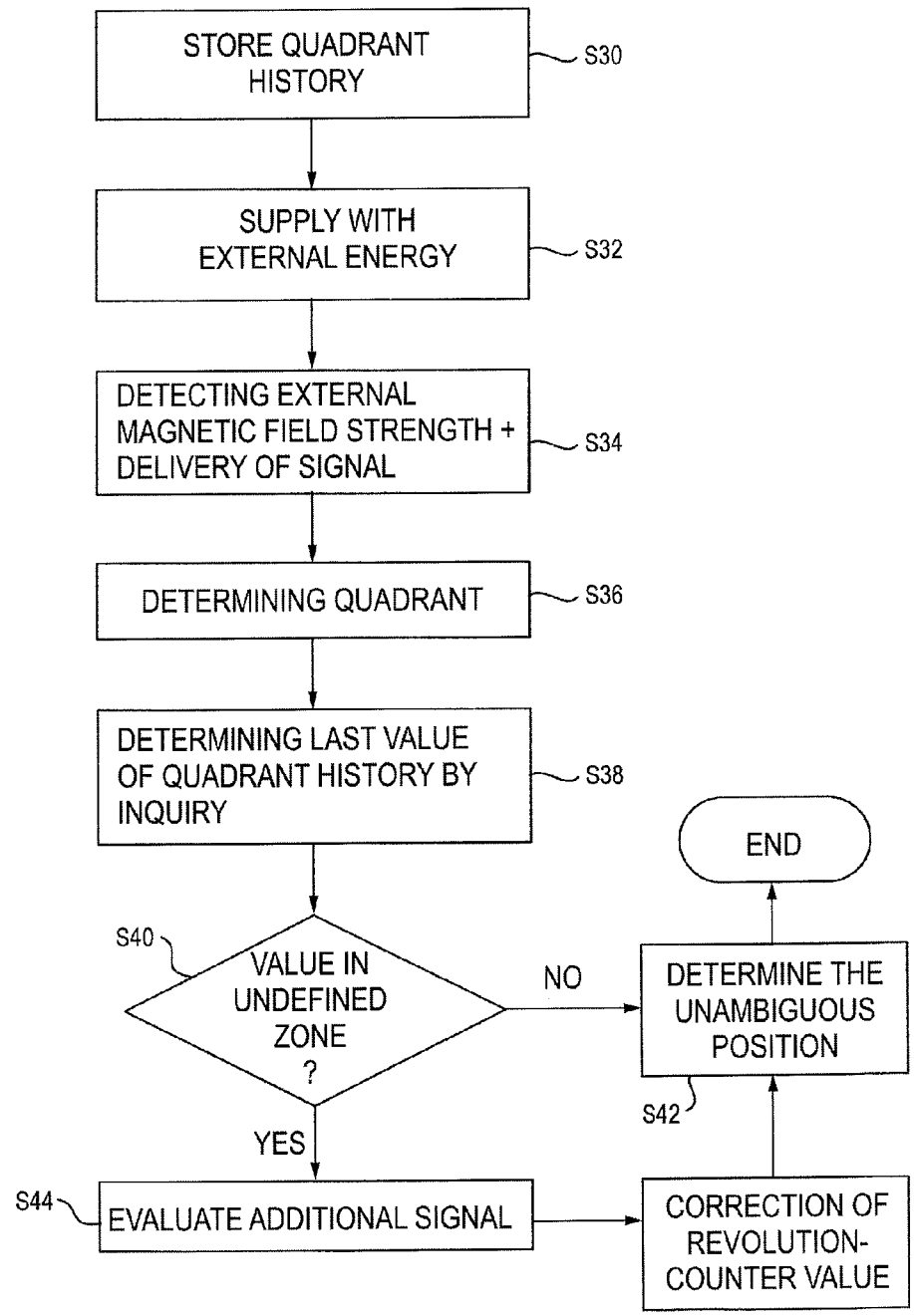

The flow chart of FIG. 7B shows generalization of the above-described method for determining an unambiguous position of the encoder shaft rotating about the rotational axis 19.

In step S30 a history of quadrant values is recorded, or stored, in the history memory, wherein each of the quadrant values corresponds to one of the remagnetization pulses 52 triggered in the pulse wire sensor 12 by a specific change of the external magnetic field due to rotation of the encoder shaft, wherein each of the quadrant values is determined by the evaluation unit 15, which considers the current signal value (Px2) delivered by the xMR element 14 to the evaluation unit 15 due to the remagnetization pulse 52, and is delivered to the history memory 78.

During a period of time, including a discrete point in time for which the unambiguous position of the encoder shaft is to be determined, the following steps are performed. In a step S32 the evaluation unit 15 and the xMR element 14 are supplied with an external energy. In step S34 strength of the external magnetic field 40 at the discrete point in time is detected by means of the xMR element 14 and a corresponding signal value Px1, or Px2, is delivered to the evaluation unit 15. In step S36 it is determined by means of the evaluation unit 15 in which of the quadrants Q1-Q4 the delivered signal value Px1, or Px2, is located. In step S38 the last quadrant value is inquired, which has been stored last in the history in the history memory 78, wherein the inquiry is conducted by the evaluation unit 15.

In step S40 it is checked by the evaluation unit 15 whether the delivered signal value Px1, or Px2, is located within the forbidden quadrant zone Z1, or Z2, being assigned to the last stored quadrant value Q2, wherein for each of the quadrant values a specific forbidden quadrant zone is determined and recorded in advance.

If the delivered signal value Px1, or Px2, is located outside the forbidden quadrant zone Z1, or Z2, in step S42 the unambiguous position is determined by summing the absolute rotational angle and a current revolution-counter value. Otherwise, in step S44 an additional signal is evaluated, which is additionally generated by the pulse wire sensor 12, wherein this signal causes correction of the revolution-counter value by means of the evaluation unit 15, and wherein the absolute rotational angle is determined on the basis of the additional signal before the unambiguous position is determined from the absolute rotational angle and the corrected rotational angle.

A second solution approach is shown in FIGS. 8A and 9A, wherein at least two wires 36 are used in the pulse wire sensor 12.

In FIG. 8A a side view of a MT rotary encoder 10, which is illustrated in a highly simplified manner, is shown, wherein the pulse wire sensor 12' thereof comprises two pulse wires 36-1 and 36-2 as well as one coil 38 surrounding the pulse wires 36-1 and 36-2. In the view of FIG. 8B a cross section of the pulse wire sensor 12' of FIG. 8A is shown. It is shown that the two pulse wires 36-1 and 36-2 are arranged on top of each other. The pulse wires 36-1 and 36-2 substantially extend parallel to each other. A longitudinal direction of the wires 36-1 and 36-2 is orientated perpendicular to the rotational axis 19.

As described with reference to FIG. 6 before, a causal problem with the signal evaluation is to be seen in that the remagnetization pulse 52 or 52' in the quadrant Q1 is lost during the reversing process because only one average pulse is generated at this point which pulse is energetically not sufficient for the required evaluation of the corresponding quadrant Q1 through the ST sensor, or the xMR element 14.

In order to fight this, the pulse wire sensor 12' of FIG. 8A can be used. One particularity of this pulse wire sensor 12' is that it comprises only one single coil 38 but at least two wires 36-1 and 36-2. Both of the wires 36-1 and 36-2 deliver the above-described remagnetization pulses 52 and 52' if the MT rotary encoder 10 in accordance with the arrangement of FIG. 1 is used together with the pulse wire sensor 12' of FIG. 8A. Since both of the wires 36-1 and 36-2 respectively deliver the above-described remagnetization pulses 52 and 52' typically two remagnetization pulses 52 and 52' are obtained in each quadrant.

A former 80 surrounding both of the wires 36 and being arranged within the coil 38 is manufactured from a material which is magnetically non-conducting such as stainless steel, glass, or plastic.

Due to the different spatial positions of the wires 36-1 and 36-2 (cf. distances a and b in FIG. 8A) relative to the excitation magnet 16 the ignition thresholds 54 and 56 for the flopping-over of the respective cores 48 and jackets 46 are displaced relative to each other. With a corresponding dimensioning this results in that the points P1.1 and P1.2 of the first wire 36-1 and the points P1.1' and P1.2' of the second wire 36-2, which are shown in FIG. 6, are phase-shifted to each other so that the point 1.2' is located in front of the point P1.1. Therefore, the above-described special case (i.e., pulse of average energy) during the reversing process of both of the wires 36-1 and 36-2 is not possible at the same time and the error image, which is not desired, can occur at maximum only with one of the wires 36-1 and 36-2. Thus, even during the reversing process at least one large remagnetization pulse in one of the two wires 36-1 and 36-2 is generated so that the quadrants can be detected unambiguously. Alternatively, the quadrant history is unambiguous and can be used after the turning-on of the external supply voltage together with the current ST position for restoring the uniqueness and steadiness of the (overall) position which actually is to be detected.

Another alternative to the second solution approach of FIGS. 8A and 8B is shown in FIGS. 9A and 9B. FIG. 9A shows a top view of a pulse wire sensor 12" having at least two wires 36, wherein the coil 38 is not illustrated. FIG. 9B shows a cross section of wires 36-1 and 36-2, which are arranged side-by-side in this case. With FIG. 8B the wires 36-1 and 36-2 have been arranged on top of each other. The wires 36-1 and 36-2 of FIG. 9B lie in one plane arranged parallel relative to the rotational plane 32 (cf. FIG. 1). The wires 36-1 and 36-2 of FIGS. 9A and 9B are not parallel within an arrangement plane thereof but enclose together an angle. If more than two wires 36 are used, then all of the wires 36 are not orientated in parallel to each other but respectively comprise an angle relative to a neighbor. In FIG. 9A both of the wires 36-1 and 36-2 are exemplarily arranged in a V-shaped manner.

Due to the different relative angular position of the wires 36-1 and 36-2 the ignition thresholds 54 and 56 for the flopping-over of the jackets 46 and the cores 48 are again slightly displaced relative to each other. The same effect like with the pulse-wire sensor 12' of FIG. 8A appears.

Figure 10A:
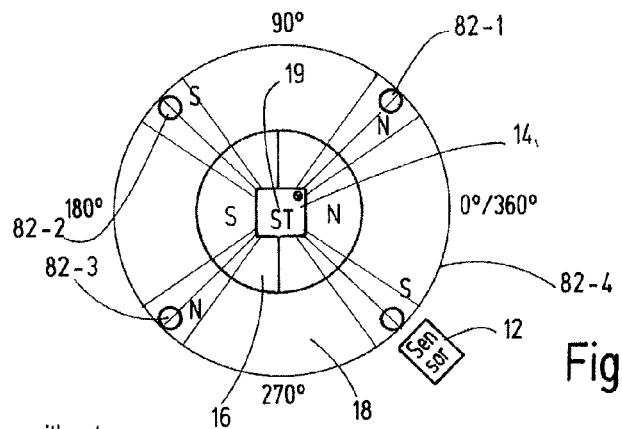
FIG. 10A shows a top view of a MT rotary encoder including additional magnets.
Figure 10B:
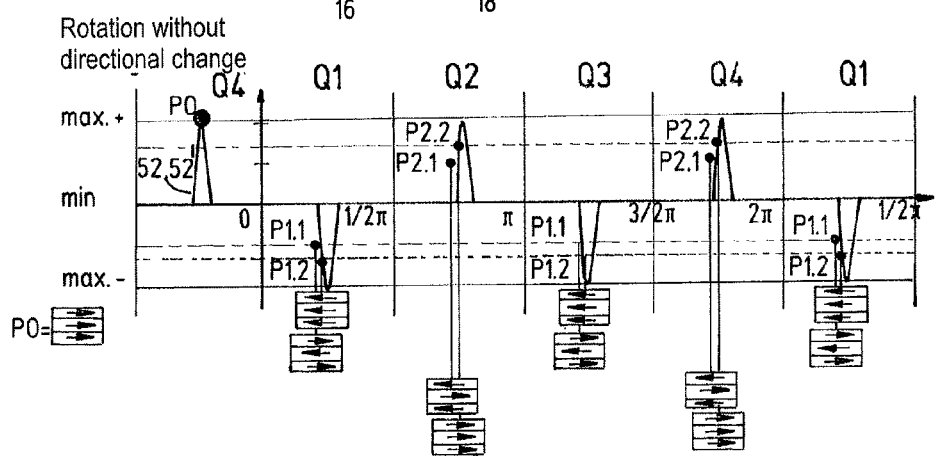
FIG. 10B shows a signal without directional change.
Figure 10C:
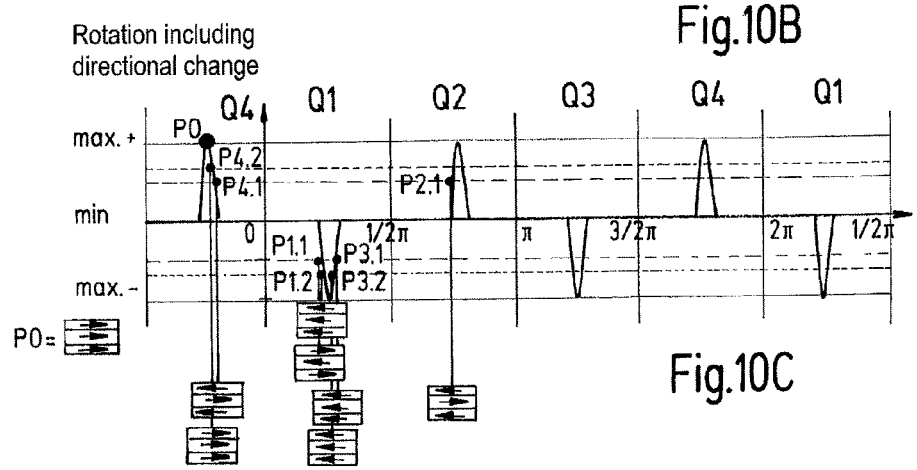

A third solution approach is shown in FIG. 10A. The MT rotary encoder 10 of FIG. 10A is basically is formed in accordance with the arrangement of FIG. 1, wherein beside the centrically arranged excitation magnet 16 further additional magnets 82 are shown. FIG. 10A shows a top view of an MT rotary encoder 10 having several additional magnets 82. FIG. 10B shows the course of the magnetic field during rotation of the encoder shaft 18 without directional change. FIG. 10C shows the course of the magnetic field during rotation including a directional change.

With reference to FIG. 10A hereinafter the structure of the MT rotary encoder 10 will be described as far as amendments in comparison to the structure in accordance with FIG. 1 are concerned. The excitation magnet 16 and the xMR element 14 (ST sensor) are still arranged centrically. The pulse wire sensor 12 is radially displaced, i.e. arranged eccentrically. Beside the central excitation magnet (dipole) 16 several additional magnets 82 are used, presently four additional magnets 82-1 to 82-4 in total. The additional magnets 82 are also arranged radially displaced relative to the rotational axis 19 along a circumferential direction of the encoder shaft 18. The additional magnets 82 are distanced preferably equally relative to each other with regard to an angular position thereof. The additional magnetic fields of the additional magnets 82 are substantially orientated in parallel to the rotational axis 19, whereas the external magnetic field 40 of the excitation magnet 16 is still orientated perpendicular relative to the rotational axis 19. The additional magnets 82 are arranged at alternating polarity (cf. N and S) relative to a respective neighbor thereof. It is clear that the pulse wire sensor 12 is orientated correspondingly for allowing detecting the additional magnetic fields of the additional magnets 82. In this case this means that the wire(s) 36 is/are orientated in parallel relative to the rotational axis 19.

As described above one causal problem is to be seen in that one of the large remagnetization pulses 52 and 52' in FIG. 6 is lost during the reversing process because only one average pulse, instead of the large pulse, is generated under the above-described particular assumption. As a rule, the average pulse is energetically not sufficient for the required reading-out of the corresponding quadrant via the xMR element 14.

In order to counteract, the eccentrically arranged additional magnets 82 are used. The additional magnets 82 only serve for driving (energy generation) the pulse wire sensor 12. The centrically arranged dipole remains for the ST measurement. The further additional magnets 82 are (radially or axially) realized discretely and are integrated into a receiving flange of the encoder shaft 18, which is not shown in further detail. However, the additional magnets 82 can also be formed, for example, as a multi-pole ring.

The arrangement of the additional magnets 82 shown in FIG. 10A ensures during a 360° rotation of the encoder shaft 18 one remagnetization pulse 52, or 52', in the points P1.1, P2.1, and so on (cf. FIG. 10B) in each of the quadrants Q1-Q4. However, if the sense of rotation is reversed the detection of the corresponding quadrant might fail (cf. FIG. 10C).

This misbehavior can be compensated by means of software at each (large) remagnetization pulse 52 by considering the quadrant history (e.g., the two last quadrants, or optionally the last quadrant and the last determined rotational direction). For this purpose, the corresponding information can be buffered with each large remagnetization pulse 52 or 52'. Due to the fact that during the turning-on of the external supply voltage the current quadrant can be determined unambiguously through the ST sensor, and due to the fact that the quadrant history is recorded also synchronization of the ST position with the revolution counter is possible.

Figure 11A:
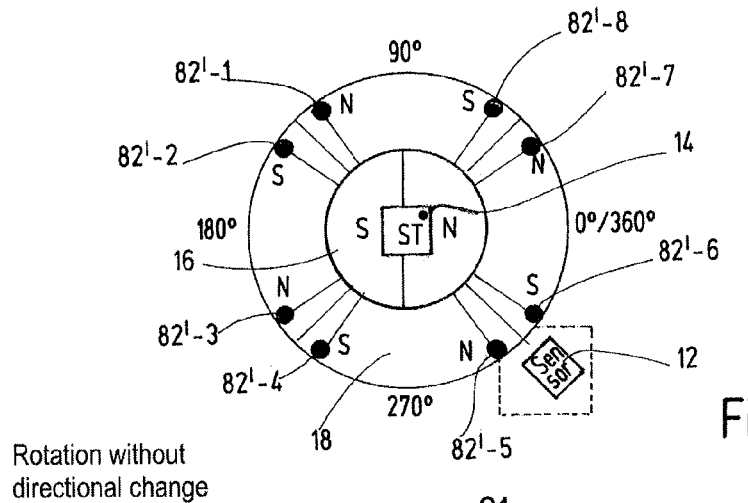
FIG. 11A shows a top view of another MT rotary encoder having additional magnets.
Figure 11B:
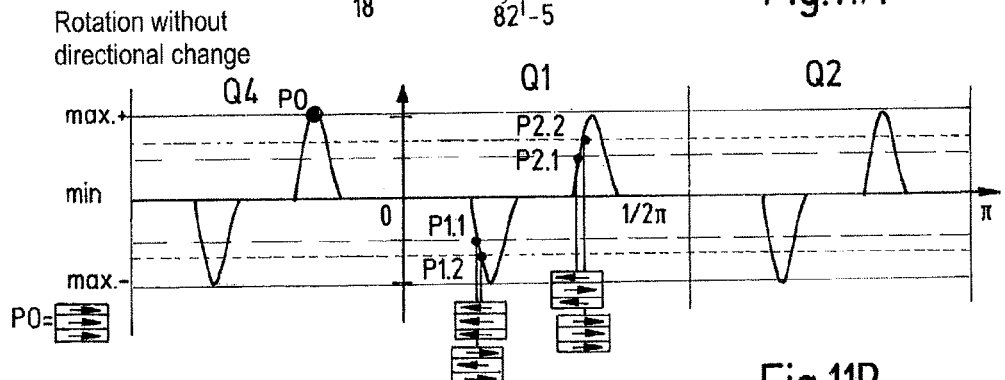
FIG. 11B shows a signal without directional changes.
Figure 11C:
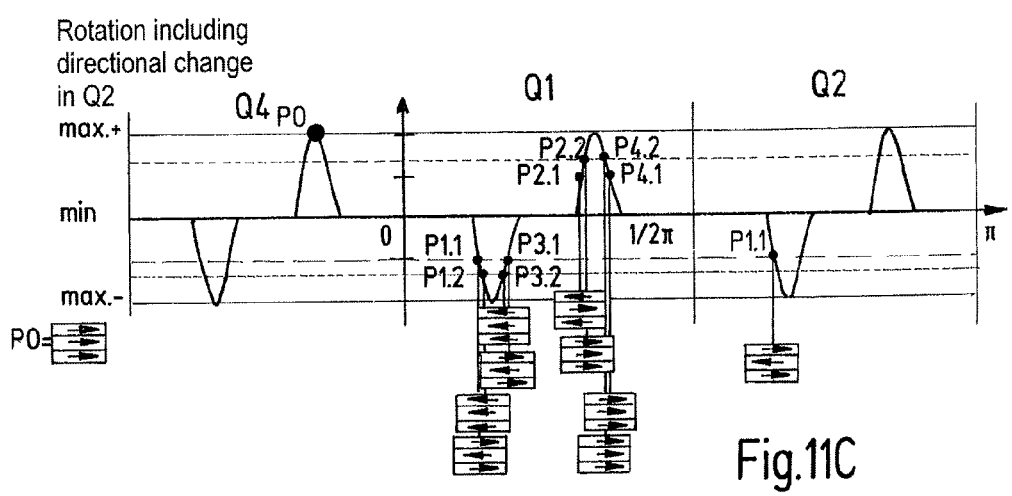
FIG. 11C shows a signal including directional changes.

A fourth solution approach is shown in FIG. 11A which approach follows the structure of FIG. 10, wherein, however, an eight-pole or multipole additional magnet 82' is used. FIG. 11A shows a top view. FIG. 11B shows a rotation without directional change. FIG. 11C shows a rotation including a directional change in the quadrant Q1.

Like the third solution approach the fourth solution approach is based on a multipole additional magnet 82' used for counting the revolutions. In FIG. 11A eight-pole (or even higher-pole) additional magnets 82'-1 to 82'-8 are provided in the circumferential direction. This arrangement of the additional magnets 82' ensures during one 360° revolution at least one, typically two, large remagnetization pulses 52 and 52' in each of the quadrants Q1-Q4 (cf. FIG. 11B). If the sensor rotation is reversed an average remagnetization pulse, instead of a large remagnetization pulse, can also be generated separately once again. However, since for each of the quadrants Q1-Q4 two large remagnetization pulses 52 and 52' are typically generated, it is ensures that based on the at least one large remagnetization pulse 52, or 52', the respective quadrant Q1 to Q4 can be detected. Thus, the additional magnets 82' provide the above-mentioned additional signal.

Thus, each hardware or software correcting measure becomes superfluous with the fourth solution approach for both a pure revolution counting without external supply voltage and the synchronization with the ST during the turning-on of the external supply voltage. The displacement of the zero passages between the ST and the revolution counter are to be considered. The eight additional magnets 82'-1 to 82'-8 can be arranged in angular segments of 45° as exemplarily shown in FIG. 11A. However, the additional magnets 82' can also be arranged in a different angular arrangement if more advantageous for the driving of the pulse wire sensor 12.

To draw a conclusion with regard to the presently exemplary described four solution approaches they are all based on a quadrant system. This system can also be transferred to other reference systems, for example, to systems having segments of 120°. The revolution counting and the recognition of the sense of rotation can be derived therefrom during detection of the "segment history" or the 120° segments as well. In case of the fourth solution approach including eight additional magnets 82' then only six magnets are required for the same solution principle. However, as a rule, such a non-binary reference system results in greater drawbacks with subsequent correcting algorithms for the revolution counting, or with the synchronization of the ST with itself. Binary values can be processed faster and more energy-efficient.

Instead of detecting complete revolutions, of course, angular segments of a complete revolution can be counted. In this case the corresponding angular segment should be encoded absolutely. In this case, this principle can also be transferred to linear measuring systems. In this case linear partial segments, which are encoded absolutely, are counted and an overall position is determined from the counted number of segments and the current segment position.

Each of the axially orientated additional magnets 82 and 82' of FIGS. 10A and 11A can, of course, also be orientated radially with the third and fourth solution approaches.

Based on the shown multipole technology used for counting the revolutions in accordance with the third or fourth solution approach a hollow-shaft encoder can also be realized. In this case the centrally sitting dipole magnet can be replaced by absolutely encoded measuring standard, being formed annular or disc-like, of the ST sensor (cf. FIG. 12). This measuring standard does not necessarily need to be magnetic but can also be encoded, for example, capacitively and can interact with a corresponding ST sensor, as far as this ST sensor can be operated with a correspondingly low energy. For this purpose, in the following a more detailed explanation will be given with reference to the FIG. 13 ff.

With the third and fourth solution approaches the additional magnets 82 and 82' are orientated radially for the pulse wire sensor 12 and the absolutely encoded measuring standard is orientated axially. Basically, these orientations can also be ex-changed. Alternatively, the two orientations can be realized axially or radially.

Figure 12:
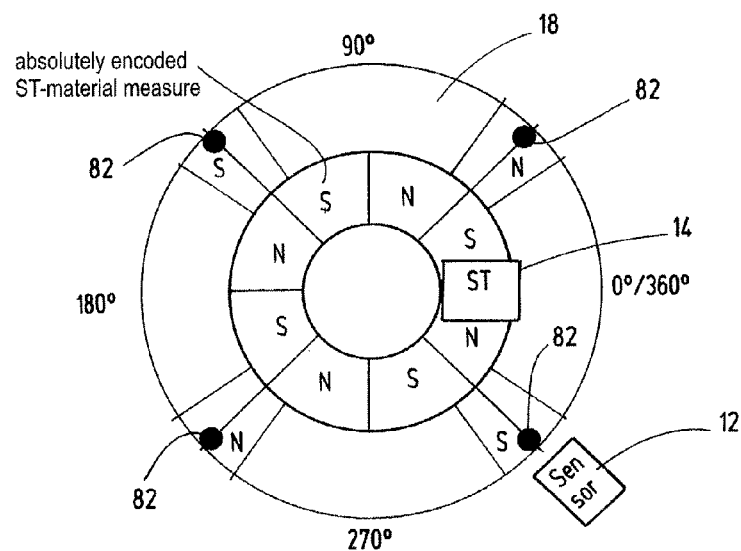
FIG. 12 shows a top view of still another MT rotary encoder.

In FIG. 12 a top view of another embodiment of the MT rotary encoder 10 is shown, wherein the absolutely encoded ST measuring standard, which corresponds to the excitation magnet 16 of FIG. 1, is realized in terms of a magnetic ring. In this case the xMR element 14 is arranged eccentrically above the ring.

In the following section of the description the structure and the mode of operation of an optical MT rotary encoder 10' (cf. FIG. 13), comprising a measuring standard which—instead of being magnetic as before—is now optically encoded and interacts with a corresponding ST sensor 14', or 100, will be explained with reference to the FIGS. 13 to 18.

Figure 13:
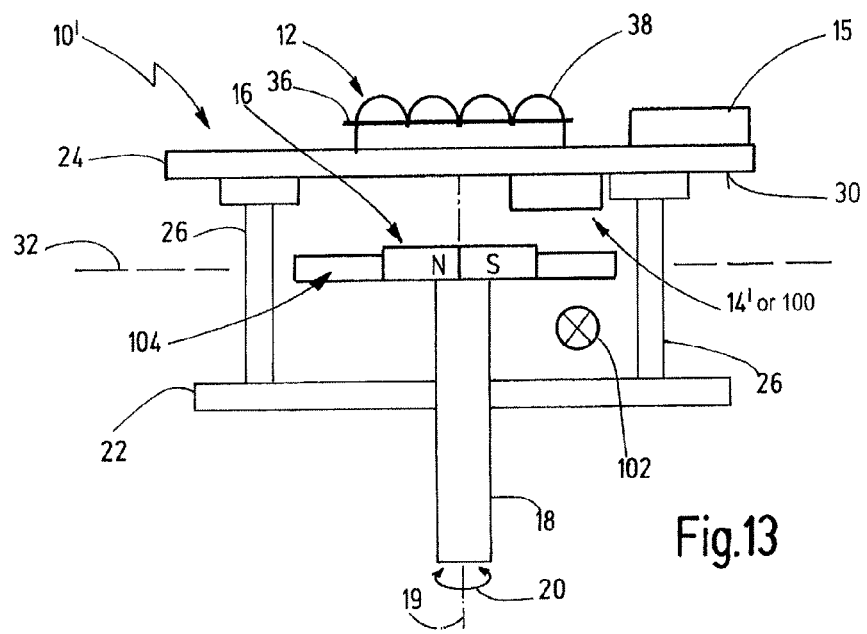
FIG. 13 shows a structure of an optical MT rotary encoder.

In FIG. 13 the structure of an optically operating MT rotary encoder 10' is shown which is almost identical to the structure of the MT rotary encoder 10 of FIG. 1. The only difference is to be seen in the optical ST sensor 14' which is presently realized in terms of an optical sensor 100 (e.g., as a photodiode). The optical sensor 100 can be arranged again, similar to the xMR element 14 of FIG. 1, on the bottom side 30 of the circuit board 24. The optical sensor 100 is arranged oppositely to a light source (e.g., LED). Between the optical sensor 100 and the light source 102 an encoding 104 is provided, which will be explained in more detail hereinafter. The optical encoding disc 104 extends in the rotational plane 32 of the excitation magnet 16, which in turn is presently realized as a (permanent) dipole. The excitation magnet 16 is arranged centrically relative to the rotary encoder shaft 18. The optical sensor 100 and the light source 102 are arranged eccentrically relative to the rotational axis 19.

Figure 14:
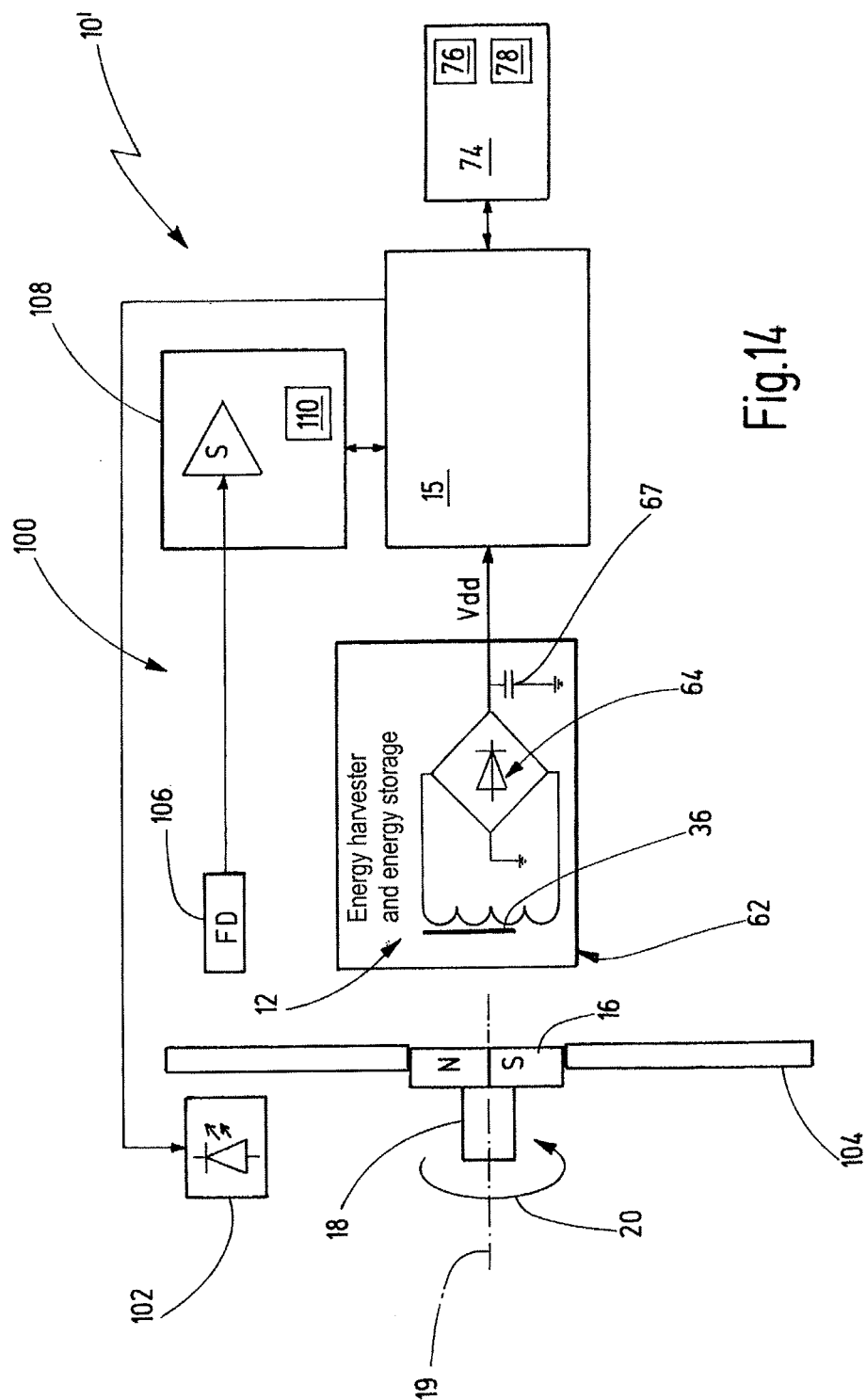
FIG. 14 shows a block diagram of the optical MT rotary encoder of FIG. 13.
Figure 15:
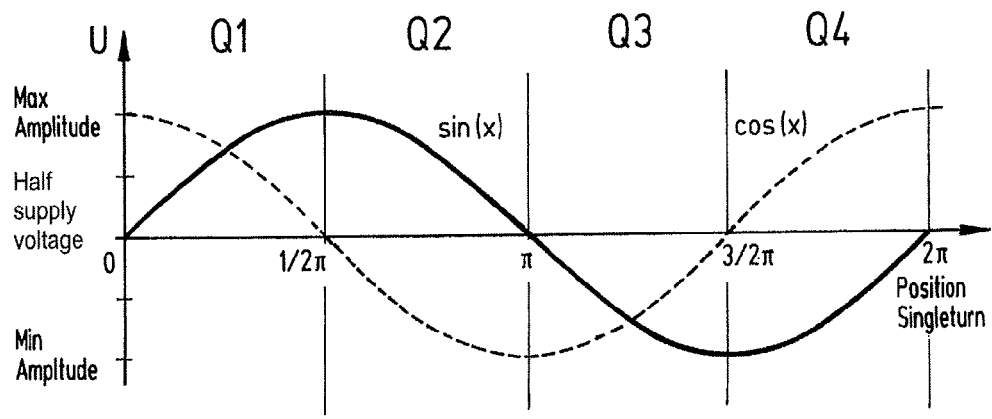
FIG. 15 shows sine and cosine output signals of the MT rotary encoder of FIG. 13.
Figure 16:
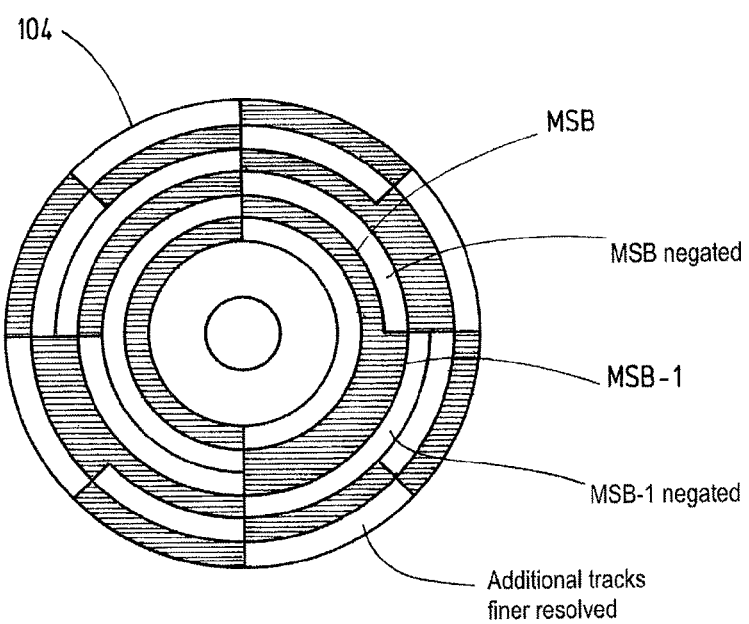
FIG. 16 shows a encoding disc of the MT rotary encoder of FIG. 13.

The following characteristics are relevant in the light of the following description of the MT rotary encoder 10' of FIGS. 13 and 14:

The wire 36 has a tough-magnetic jacket 46 and a soft-magnetic core 48, and thus represents a bistable magnetic element. An outer magnetic field 40 having a specific strength and a magnetization direction opposite to the pulse wire 36 causes the magnetization direction of the wire 36 to flop-over abruptly (Wiegand effect).

In a coil 38 wrapped around the wire 36 a change of magnetic flux caused by rotation of the encoder shaft 18, or the excitation magnet 16, induces an electric remagnetization pulse which lasts roughly 20 μs.

The energy content of such a remagnetization pulse is in the range of 40 to 150 nWs and depends amongst other things on the length of the pulse wire, characteristics of the coil 38, load resistances, and the like.

Length of the remagnetization pulse and energy content thereof are widely independent of the velocity of change of the excitation magnet 16.

In FIG. 14 is a block diagram of the MT rotary encoder 10' of FIG. 13. The first block 62 of FIG. 14 is formed identically to the block 62 of FIG. 3. The optical sensor 100 can comprise a photodiode 106 and a block 108 for the signal generation. The block 108 can also comprise a register 110 for storing specific values, which register will be explained in further detail below.

While the external voltage supply is turned off, also even with the optical solution at least the revolution counting needs to be performed in an energy-self-sufficient manner. The pulse wire sensor 12 converts the kinetic energy of the shaft motion in a pulse-like manner into electric energy and provides it to the components 62, 100, 15 and 74. Once again only extreme little energy (40-150 nWs) is available for the counting of revolutions while the external voltage supply is turned off. This means that the complete revolution-counting process needs to be fed by the energy content of one remagnetization pulse which can be buffered, for example, in the capacitor 67. Even with the presently described solution approach the pulse wire sensor 12 is exclusively used as a generator. All required information for counting the revolutions and the determination of the fine position are derived from the signal of the optical ST sensor 14'. As explained above, additional auxiliary sensors such as Hall switches are not required for counting the revolutions and are superfluous. This allows a cost-efficient and component-reduced embodiment. This also simplifies the dimensioning and forming of the excitation magnet 16 with reference to the pulse-wire sensor 12 since only the aspects, which are relevant with regard to an energy balance, need to be considered and signal-related boundary conditions do not need to be considered additionally.

However, for counting the revolutions an ST sensor is required in general which gets along with extremely few energy. This is particularly not self-evident with optical sensors since light sources generally consume very much energy. Even modern high-efficient semiconductor diodes (e.g., LED) require in a conventional ST rotary encoder a current having a size of 2 mA to 40 mA. However, this is more than the pulse-wire sensor 12 can deliver. Further, additional energy is required for the other system components, in particular for the signal evaluation and storage.

With the solution described in the following individual operational modules such as a light source 102, an optical signal conditioning in the block 108, and the storage element 74 are activated by the evaluation unit 15 for a very short time only, i.e. supplied with energy. For a very short time means that the energy is temporarily available substantially shorter for the operational module than the remagnetization pulse lasts. Duration of the activity of the operational modules, in principle, is not coupled to a fixed time grid but only to the time required for the processing of their respective task.

The mode of operation of the MT rotary encoder 10' will be explained below with reference to the FIGS. 13 to 18 on the basis of a pulse wire sensor 12 as energy supplier and on the basis of an optical sensor for both the revolution counting and the determination of the accurate fine position within one 360° revolution.

During revolution counting without external supply voltage the energy for the determination of the number of 360° revolutions is gained from the mechanical movement of the encoder shaft 18 to which the excitation magnet 16 is mounted in a rotary-fixed manner. During the symmetric operation of the pulse wire sensor 36 respectively one positive and one negative remagnetization pulse 52 or 52' are generated when the bipolar excitation magnet 16 is continuously rotated over 360° and the required ignition thresholds 54 (cf. FIG. 4A) are exceeded. Again, the MT rotary encoder 10' is dimensioned such that the ignition thresholds 54 are located as central as possible in the quadrants Q1-Q4. Thereby, the MT rotary encoder 10' obtains a maximum bandwidth of tolerance of ±45° between the angle position of the pulse-wire sensor 12 and the optical ST sensor 14' (cf. FIG. 13). Also, in this manner the assembly of the components of the MT rotary encoder 10' is simple. The MT rotary encoder 10' is stable over wide ranges of temperatures.

Immediately after an operational readiness of the evaluation unit 15, which follows after the generation of a remagnetization pulse, the position of the optical ST sensor 14', or 100, is inquired. The same is true for the quadrant Q1-Q4 in which the remagnetization pulse 52 or 52' was triggered last. The old status (quadrant history of the last stored quadrant and the revolution-counter reading) are read from the storage element 74 (cf. FIG. 14). In accordance with FIGS. 7A and 7B from this information one of the following actions can be derived unambiguously:

Only the quadrant history is updated.

The revolution counter 76 is incremented by half a revolution and the quadrant history is updated.

The revolution counter is decremented by half a revolution and the quadrant history is updated.

Subsequently the status (quadrant history and revolution-counter reading is updated in accordance with the new data and the updated data is stored in the storage element 74.

The quadrants Q1-Q4 correspond to four angular areas of the external sine-shaped magnetic field 40 during the rotation of the encoder shaft 18, or the excitation magnet 16 (cf. FIG. 4A). With a corresponding orientation of a 360°-measuring optical ST sensor 100 relative to the pulse wire sensor 12 the position of the two MSB of the ST position corresponds at the same time (at least roughly) to the position of the 90°-quadrants of the sine course of the external magnetic field 40. Therefore, it is sufficient during operation without an external supply voltage to determine only the two MSB of the ST position. A digitally encoded encoding disc 104 also allows direct readout of the two MSB (cf. FIG. 16).

With an analogously encoded encoding disc such as a sine-signal or co-sine-signal for each 360° revolution (cf. FIG. 4B) these signals can be digitalized via respectively one Schmitt trigger S for generating the quadrant information. Alternatively, an already existing AD converter, which delivers highly resolved ST position information during external supply voltage, can be used as a simple 2-bit AD converter.

Figure 17:
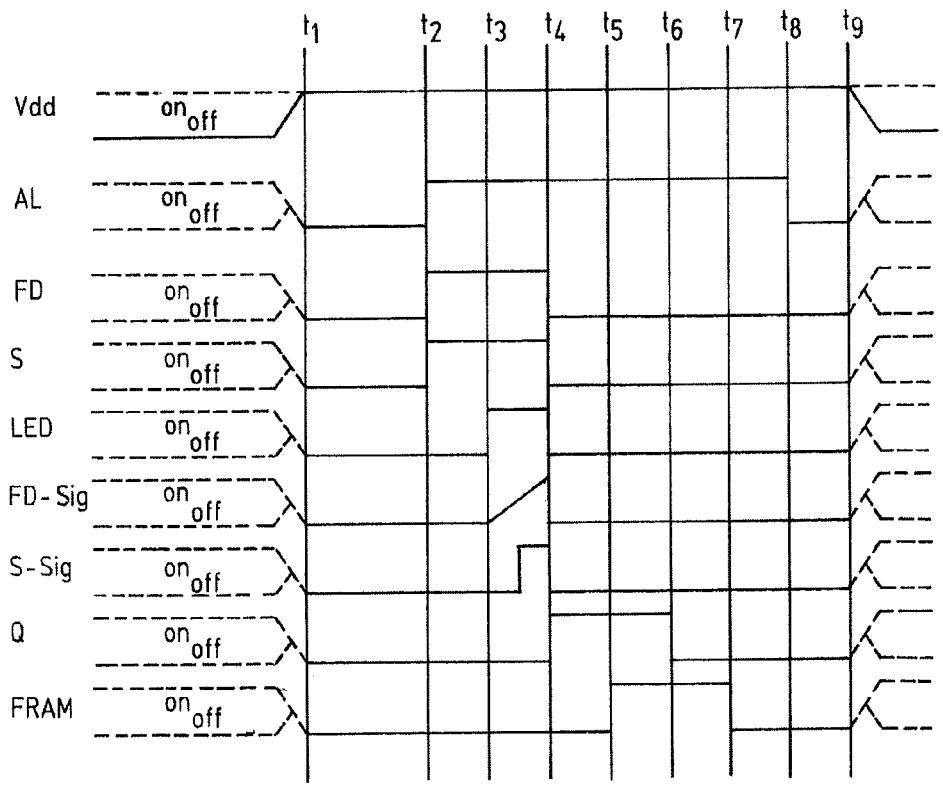
FIG. 17 shows an overview of signals of different operational blocks of the MT rotary encoder of FIG. 13.

In order to configure an energy balance positively and to allow the optical ST sensor 100 to perform its function based on such a small energy quantity, measures are required which are illustrated below with reference to FIGS. 14 and 17. FIG. 17 shows signal courses of different operational components of FIG. 14.

With reference to FIG. 17 only the evaluation unit (AL) 15 is supplied with current, and thereby activated, at the time t2 after a remagnetization pulse was triggered at the time t1 from which the operating voltage $V_{dd}$ results. The evaluation unit 15 activates the additional operational blocks in an energy-saving manner, as will be described below with reference to an exemplary sequence.

At the time t2, thus simultaneously or immediately after the start of the evaluation unit 15, the photodiode(s) (FD) 106 and one or more Schmitt triggers S are activated which are required for the reading of the ST-MSB. Then, at the time t3 the light source 102 such as an LED is turned on. Between the times t3 and t4 the photodiode 106 has reached a value (FD-Sig) at which the Schmitt trigger S has switched and output a digital signal S-Sig which, for example, can be temporarily kept in the register 110 for the further process. Thereby the operational blocks 106 S, and in particular the energy-intense light source 102 can be switched off at the time t4 since operation thereof is no longer required.

After an evaluation of each photodiode signal, i.e. after the time t4, the information in which quadrant the remagnetization pulse 52 or 52' was triggered is present. Thus, the individual register contents of the digitized photodiode signals can be omitted and the registers can be turned off after the time t4 as well.

At the time t5 the (non-volatile) memory 74 is activated and the data stored there (revolution-counter reading and quadrant history) are read. This, as explained above, is associated with the currently determined quadrant, updated, and written into the memory 74. Then, the memory 74 is turned off again at the time t7.

Before this happens the operational block for the quadrant determination can already be deactivated at the time t6.

At the end t8 even the evaluation unit 15 terminates its operation in a controlled manner before the remagnetization pulse decays at the time t9.

Already here it is to be remarked that with the presently described process it is also partially possible to run individual functions even in parallel instead of only sequentially.

During the operation of the MT rotary encoder 10' with an external supply voltage not only the above-described revolution counting is realized but also a fine position of the ST sensor 100 is evaluated continuously. For the generation and later output of the (overall) position, which is built from the number of 360° revolutions of the revolution counter 76 and the fine-resolved position (absolute rotational angle) of the ST sensor 100, it is to be considered that the zero passages of the ST and the MT are not identical. Without synchronization of the two information the associated overall position output is not steady. The synchronization of the two information, however, can be realized by means of the ST-fine position determined during the turning on of the external supply voltage, by means of the current quadrants derived therefrom, and by means of the last determined revolution-counter values. The information is also determined on the basis of the quadrant history and the revolution-counter reading. A respective information pack-age, formed thereof, can be assigned to a specific correcting value for determining the accurate and steady overall position of the ST and MT raw data.

During the operation of the MT rotary encoder 10' with the external supply voltage the number of the 360° revolutions can also be determined without the revolution counter 76 based on the determination of the passed zero passages of the ST sensor 100. Thereby, also the synchronization is omitted since in this case the zero passages for both systems (ST and MT as well as revolution counting) are identical. In a high-dynamic operation of the MT rotary encoder 10' a better real-time skill is achieved thereby, since the computing expenditure of the synchronization is completely omitted and arises only once after the turning-on of the external supply voltage.

The advantages of the presently shown MT rotary encoder 10 and 10' in comparison to the prior art are listed amongst other things hereinafter:

Only one single pulse (wire) sensor 12, or 12', and only one single excitation magnet 16 are required compellingly.

An additional specific Hall switch for detecting the polarity of the external magnetic field 40 is not required, since the magnetic polarity is of no importance for the present principle of the invention. Only the quadrant-information of the ST sensor is considered for determining the number of completely passed 360° revolutions.

The ST sensor 14, 14' or 100 delivers as the only component every information required for the revolution counting and for the detection of the ST-fine position for each 360°. In this manner the circuitry is simplified. Thus, also the overall costs can be lowered. For example, it is not required to detect and store the polarity of the remagnetization pulse and the polarity of the magnetic field.

A quadrant-related evaluation is conducted which allows a high mounting tolerance and which is stable over wide temperature ranges.

The invention does not only image a revolution counter but represents a low-priced solution for the entire encoder system which is particularly formed an optical ST sensor, a (revolution counting) evaluation unit 15, and a simple low-priced synchronization unit (e.g., in terms of the evaluation unit 15).

The MT rotary encoders 10 and 10' are energy-self-sufficient. No support battery for securing data is required while the external supply voltage is turned off.

No wear-loaded components such as transmission gears systems are used.

No expensive flux-conducting pieces are required.

For the determination of the quadrants, in the simplest case, the two MSB of the ST dataword can be considered.

With the optical solution no magnetic high-sensitive ST sensor (xMR element 14) is used which would need to be screened with many efforts against external (alien) magnetic fields.

A high-resolving and high-accurate MT rotary encoder having a ST functionality can be realized on the basis of the optical principle of operation.

Alternatively different energy generators can be used as the pulse-wire sensor 12 or 12'. Therefore, one generally speaks of a pulse sensor. In general, the following principles are known for pulse sensors.

An inductive mechatronic system, which is based on a slightly magnetized leaf spring which is deflected and abruptly sways back if a corresponding magnet passes, when the magnetic holding torque comes below the mechanical return force (cf. DE 102 29 978 B4). Thereby one or more pulses are induced in the coil surrounding the leaf spring.

A similar method uses a piezoelement sitting on a leaf spring for the spontaneous energy conversion (cf. DE 2004 055 625 A1).

Another method is based on a Reed switch being wrapped by a coil. If a corresponding magnet is moved-by, the Reed switch switches and changes the magnetic flux the same time so abruptly that a pulse is generated in the coil as well. However, a disadvantage of this system is to be seen in the wear due to the mechanical support as well as due to shock and vibration sensitivity caused by the own mass.

Instead of a dipole also a multipole magnet can be provided for driving the pulse sensor. Thereby, the same system principle can be applied which in this case does not count, however, half-revolutions but, for example, correspondingly smaller angular segments of one 360° revolution. This can be of interest, for example, if the principle in accordance within the invention is used in the context of a hollow-shaft variation, wherein the magnet cannot be realized at all or only badly as a dipole, for example, because the diameter is too great and one has to fall back on a multipole magnet.

Figure 18:
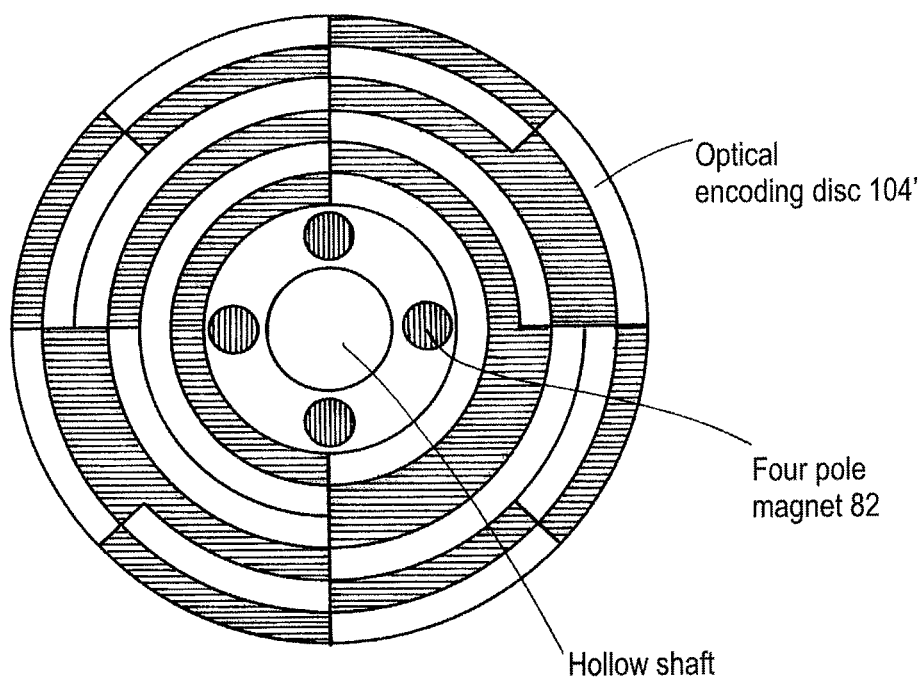
FIG. 18 shows a modification of the encoding disc of FIG. 16.

In FIG. 18 an optical encoding disc 104' is shown which can be used with (multipole) additional magnets 82 in accordance with the above-described embodiment of the hollow-shaft variation. The 4-pole variation is exemplarily shown in combination with an optical co-carrier. In this case an absolutely-encoding optical measuring standard takes over the role of the absolute magnetic measuring standard shown in FIG. 10A, 11A or 12.

The invention claimed is:

1. An energy-self-sufficient multiturn rotary encoder configured for energy-self sufficiently detecting a number of completely passed 360° revolutions of an encoder shaft, which rotates about a rotational axis, wherein an excitation magnet is mounted in a rotationally fixed manner to the rotational axis, wherein the excitation magnet generates an external magnetic field, and also being configured for determining an absolute rotational angle indicating a fine-resolved position within one 360° revolution of the encoder shaft, wherein the multiturn rotary encoder comprises: a pulse sensor configured for generating energy from a remagnetization pulse, which is caused in the pulse sensor by a change of strength of the external magnetic field which is sufficiently large, wherein the change of the magnetic-field strength is caused by rotation of the excitation magnet; an evaluation unit; a magnetic-field sensor configured for detecting the strength of the external magnetic field and for generating a corresponding signal a signal value of which corresponds to the strength of the external magnetic field and is delivered to the evaluation unit, wherein, wherein a signal course is sectionalized for evaluation thereof into a plurality of quadrants; a revolution counter configured for storing the number of completely passed 360° revolutions of the encoder shaft; and a history memory adapted for storing a history of quadrant values; wherein the evaluation unit is operated, in order to determine the number of completely passed 360° revolutions of the encoder shaft, with energy obtained from the remagnetization pulse; wherein the evaluation unit is adapted to: derive from the delivered signal value one of the quadrants, in which the delivered signal value is located, and to deliver a corresponding quadrant value to the history memory while one of the remagnetization pulses occurs.

2. The multiturn rotary encoder of claim 1, wherein the signal has a sinusoidal course when the excitation magnet rotates continuously about the rotational axis together with the encoder shaft.

3. The multiturn rotary encoder of claim 1, wherein the quadrants are sized equally.

4. The multiturn rotary encoder of claim 1, wherein the pulse sensor is a Wiegand sensor.

5. The multiturn rotary encoder of claim 1, wherein the magnetic-field sensor is high resistive and is an xMR element.

6. The multiturn rotary encoder of claim 1 further comprising a rectifier.

7. The multiturn rotary encoder of claim 1, wherein the pulse sensor and the magnetic-field sensor are arranged coaxially relative to the encoder shaft and relative to the excitation magnet such that the pulse sensor and the magnetic-field sensor are oppositely arranged in an axial direction relative to the excitation magnet in an assembled state of the encoder shaft and the multiturn rotary encoder.

8. The multiturn rotary encoder of claim 1, wherein n remagnetization pulses are generated for each of the completely passed 360° revolutions of the encoder shaft, and wherein each n-th remagnetization pulse of a pulse cycle causes an update of a value of the revolution-counter.

9. The multiturn rotary encoder of claim 1, wherein an orientation of the magnetic-field sensor relative a the pulse wire of the pulse wire sensor is selected such that the remagnetization pulses are respectively located substantially centrally within the corresponding quadrants.

10. The multiturn rotary encoder of claim 1, which further comprises an energy-storage device which is connected electrically to the pulse sensor and is charged only by energy obtained from the remagnetization pulses.

11. The multiturn rotary encoder of claim 1, wherein the excitation magnet is a permanent magnet.

12. The multiturn rotary encoder of claim 11, wherein the excitation magnet is a dipole which is mounted centrally to the encoder shaft.

13. A method for determining an unambiguous position of an encoder shaft rotating about a rotational axis by means of an energy-self-sufficient multiturn rotary encoder which is configured to detect a number of completely passed 360° revolutions of the rotating encoder shaft, as well as to detect an absolute rotational angle indicating a fine-resolved position within one 360° revolution of the encoder shaft, wherein an excitation magnet is mounted in a rotationally fixed manner to the encoder shaft for generating an external magnetic field, which is at least utilized for determination of the fine-resolved position, wherein the multiturn rotary encoder comprises a pulse sensor, an energy storage device, a magnetic-field sensor, a revolution counter, a history memory, and an evaluation unit, wherein the magnetic-field sensor delivers a signal having a course when the excitation magnet rotates continuously together with the encoder shaft about the rotational axis, and wherein the course shape is sectionalized for evaluation into a plurality of quadrants, wherein the method comprises the following steps:

storing a history of quadrant values in the history memory, wherein each of the quadrant values corresponds to a remagnetization pulse triggered in the pulse sensor by a specific change of the external magnetic field due to rotation of the encoder shaft, and wherein each of the quadrant values is determined by the evaluation unit, which considers a signal value, delivered by the magnetic-field sensor due to the remagnetization pulse, to the evaluation unit, and each of the quadrant values is delivered to the history memory, wherein n remagnetization pulses are generated for each 360° revolution of the encoder shaft, and wherein each n-th remagnetization pulse causes an update of the revolution counter in terms of a sense-of-rotation-independent incrementing or decrementing of a value of the revolution counter by the evaluation unit; and during a time period, which comprises a discrete point in time for which the unambiguous position of the encoder shaft is to be determined, carrying out the following steps:

supplying the evaluation unit and the magnetic-field sensor with external energy;

detecting a strength of the external magnetic field at the discrete point in time by means of the magnetic-field sensor and delivering the corresponding signal value to the evaluation unit;

determining by means of the evaluation unit in which of the quadrants the delivered signal value is located;

inquiring the last quadrant value, which has been stored last in the history memory, by means of the evaluation unit;

checking, by means of the evaluation unit, whether the delivered signal value is located within a forbidden quadrant zone, which is assigned to the quadrant value stored last, wherein a specific forbidden quadrant zone has been determined and recorded in advance for each of the quadrant values;

if the delivered signal value is located outside of the forbidden quadrant zone, determining the unambiguous position by summing the absolute rotational angle, which corresponds to the delivered signal value, and the current revolution-counter value; or otherwise, if the delivered signal value is located within the forbidden quadrant zone, evaluating an additional signal, which is generated additionally by the pulse sensor, correcting the revolution-counter value by means of the evaluation unit on the basis of the additional signal and determining the absolute rotational angle on the basis of the additional signal before the unambiguous position is determined from the absolute rotational angle and the corrected revolution-counter value.

14. The method of claim 13, wherein the excitation magnet is one single dipole magnet arranged in a plane which is substantially orientated perpendicular to the rotational axis.

15. The method of claim 13, wherein the specific forbidden quadrant zones are recorded in one of a memory of the evaluation unit and a separate memory element.

16. The method of claim 15, wherein the pulse sensor comprises a pulse wire and a coil surrounding the pulse wire, wherein the pulse wire comprises an outer jacket and a core arranged within the jacket.

17. The method of claim 16, wherein outer boundaries of forbidden quadrant zones are defined by remagnetization-ignition thresholds of the core.

18. A method of claim 13, wherein the pulse sensor comprises a pulse wire and a coil surrounding the pulse wire, and wherein the step of evaluating the additional signal and correcting the revolution-counter values comprises:

applying current to the coil for a short period of time so that the external magnetic field of the excitation magnet is superimposed by an additional magnetic field thereby generating a test-remagnetization pulse in the pulse wire which is measured subsequently by means of the coil, wherein existence or non-existence of the test-remagnetization pulse is delivered as the additional signal from the coil to the evaluation unit;

checking by means of the evaluation unit whether or not the additional signal contains the test-remagnetization pulse; and correcting the value of the revolution counter if the additional signal contains the test-remagnetization pulse, or maintaining the current revolution-counter value if the additional signal does not contain the test-remagnetization pulse.

19. The method of claim 18, wherein the step of correcting the value of the revolution counter comprises a sense-of-rotation-independent incrementing or decrementing of the current value of the revolution counter.

20. The method of claim 13, wherein the pulse sensor comprises a first pulse wire, at least one second pulse wire, a former within which the pulse wires are arranged, as well as a coil which in turn surrounds the former, wherein each of the pulse wires comprises an outer jacket and a core, which is arranged within the jacket, and wherein the pulse wires are fixed within the former in a respective default position.

21. The method of claim 20, wherein the remagnetization pulses of the second pulse wire are utilized as an additional signal.

22. The method of claim 20, wherein the pulse wires are spaced to each other in an axial direction of the encoder shaft.

23. The method of claim 20, wherein the pulse wires are arranged in one single plane oriented substantially perpendicular to the rotational axis of the encoder shaft, and wherein the first pulse wire encloses an angle which each of the second pulse wires.

24. The method of claim 13, wherein outer boundaries of the respectively forbidden quadrant zone are defined by remagnetization-ignition thresholds of the cores.

25. The method of claim 24, wherein the pulse sensor is arranged coaxially to the excitation magnet, wherein the pulse wires are arranged at least in a plane respectively oriented substantially perpendicular to the rotational axis of the encoder shaft and substantially parallel to the rotational plane of the excitation magnet.

26. The method of claim 25, wherein the excitation magnet is one single dipole magnet arranged in a plane which is substantially orientated perpendicular to the rotational axis.

27. The method of claim 26, wherein the pulse sensor is arranged eccentrically to the rotational axis of the encoder shaft, wherein beside the coaxially arranged excitation magnet at least four additional magnets are provided which are mounted to the encoder shaft in a circumferential direction providing alternating orientated magnet fields being distributed regularly so that in each of the quadrants at least one remagnetization pulse is generated, wherein the remagnetization pulses, which are deviating from the typical remagnetization pulses, deliver the additional signal.

28. An energy-self-sufficient multiturn rotary encoder for detecting a number of completely passed 360° revolutions of an encoder shaft, which rotates about a rotational axis and to which an excitation magnet is mounted in a rotationally fixed manner which generates an external magnetic field and to which an optical encoding disc is mounted for determining an absolute rotational angle indicating a fine-resolved position within one 360° revolution of the encoder shaft, wherein the multiturn rotary encoder, which is configured to detect in an energy-self sufficient manner the number of the completely passed 360° revolutions of the encoder shaft, comprises:

an evaluation unit;

a pulse sensor configured for generating energy from a remagnetization pulse which is caused in the pulse sensor by a sufficiently large change in strength of the external magnetic field, wherein the change in the magnetic-field strength is caused by rotation of the excitation magnet;

a optical sensor configured for detecting a current position of the encoder shaft and for generating a corresponding signal, the signal value of which corresponds to a current position of the encoder shaft and is delivered to the evaluation unit, wherein the signal has a course when the excitation magnet rotates continuously together with the encoder shaft about the rotational axis, and wherein the course is sectionalized for evaluation into a plurality of quadrants;

a revolution counter for storing the number of completely passed 360° revolutions of the encoder shaft; and a history memory in which a history of quadrant values is stored;

wherein the evaluation unit is operated only with energy obtained from the remagnetization pulses for determining the number of the completely passed 360° revolutions of the encoder shaft;

wherein the evaluation unit is adapted to derive one of the quadrants from the delivered signal value, wherein the delivered signal value is located in the one of the quadrants, and to deliver a corresponding quadrant value to the history memory while the remagnetization pulse occurs.

29. The multiturn rotary encoder of claim 28, wherein the optical sensor comprises an LED and a Schmitt trigger.

30. The multiturn rotary encoder of claim 28, wherein the pulse sensor is a pulse-wire sensor having at least one pulse wire and one coil surrounding the at least one wire.

31. The multiturn rotary encoder of claim 28 further comprising an absolutely encoded encoding disc which is mountable in a rotationally fixed manner to the rotary-encoder shaft.

32. The multiturn rotary encoder of claim 28 further comprising a register for storing an output signal of the optical sensor.

33. A method for determining an unambiguous position of an encoder shaft, which rotates about a rotational axis, by means of an energy-self-sufficient multiturn rotary encoder, which is adapted to optically detect a number of completely passed 360° revolutions of the rotating encoder shaft as well as to optically detect an absolute rotational angle indicating a fine-resolved position within one 360° revolution of the encoder shaft to which an excitation magnet for generating an external magnetic field is mounted in a rotationally fixed manner, wherein the external magnetic field is used for generating an energy required for counting revolutions, wherein the multiturn rotary encoder comprises a pulse sensor, an optical sensor, a revolution counter, a history memory, and an evaluation unit, wherein the optical sensor delivers a signal having a course when the encoder shaft rotates continuously about the rotational axis, wherein the course is sectionalized for evaluation into a plurality of quadrants, wherein the method comprises the following steps:

providing an evaluation energy at a point in time t1 when a remagnetization pulse is generated in the pulse sensor;

activating the evaluation unit and the optical sensor at a point in time t2 immediately after the evaluation energy is provided;

detecting an optical value, generated by illuminating the encoding disc, and outputting a corresponding signal;

determining and outputting a current quadrant corresponding to the output signal, in which quadrant the remagnetization pulse has occurred, by means of the evaluation unit;

activating the storage element and updating a quadrant history comprising the quadrant values stored last; and deactivating the evaluation unit after each of the above-mentioned steps is carried out and before the remagnetization pulse decays.

34. The method of claim 33, further comprising:
turning off the optical sensor after the corresponding signal is generated and output.

35. The method of claim 33, further comprising:
turning on a light source after the evaluation unit and the optical sensor are activated, and turning off the light source when the corresponding signal has been determined.

36. The method of claim 33, wherein the optical sensor comprises a photodiode and a Schmitt trigger.

* * * * *

UNITED STATES PATENT AND TRADEMARK OFFICE
CERTIFICATE OF CORRECTION

Page 1 of 1

PATENT NO. : 9,528,856 B2
APPLICATION NO. : 14/528272
DATED : December 27, 2016
INVENTOR(S) : Stephan Gehringer, Jurgen Palczynski and Viktor Steiner It is certified that error appears in the above-identified patent and that said Letters Patent is hereby corrected as shown below:

On the Title Page

Item (63), the following should appear:
(63) Related U.S. Application Data
Continuation of application No. PCT/EP2013/059043,
filed on Apr. 30, 2013.

Item (30), below "Foreign Application Priority Data" should read:
Apr. 30, 2012 (DE) .............. 10 2012 008 888
Apr. 30, 2012 (DE) .............. 10 2012 017 071

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*